United States Patent
Friedman et al.

(10) Patent No.: US 9,907,104 B2
(45) Date of Patent: Feb. 27, 2018

(54) SYSTEMS, APPARATUS, AND METHODS FOR PROGRAMMATICALLY ASSOCIATING NEARBY USERS

(71) Applicant: Loopd Inc., San Francisco, CA (US)

(72) Inventors: Brian Mullin Friedman, San Mateo, CA (US); Allen Houng, San Mateo, CA (US); Sambhav Galada, College Station, TX (US)

(73) Assignee: LOOPD INC., San Francisco, CA (US)

( * ) Notice: Subject to any disclaimer, the term of this patent is extended or adjusted under 35 U.S.C. 154(b) by 0 days.

(21) Appl. No.: 14/997,409

(22) Filed: Jan. 15, 2016

(65) Prior Publication Data

US 2016/0192428 A1 Jun. 30, 2016

Related U.S. Application Data

(62) Division of application No. 14/088,315, filed on Nov. 22, 2013, now Pat. No. 9,241,360.

(51) Int. Cl.
*H04B 7/00* (2006.01)
*H04W 76/02* (2009.01)
(Continued)

(52) U.S. Cl.
CPC .......... *H04W 76/023* (2013.01); *G06F 3/017* (2013.01); *H04W 4/008* (2013.01)

(58) Field of Classification Search
CPC ... H04W 76/023; H04W 4/008; H04W 8/245; H04W 24/02; H04W 88/02; H04W 84/18; H04W 88/06; H04W 76/02
(Continued)

(56) References Cited

U.S. PATENT DOCUMENTS 9,241,360 B2 1/2016 Friedman et al.
2003/0091215 A1* 5/2003 Lauper ............... G06K 9/00597
382/117
(Continued)

FOREIGN PATENT DOCUMENTS

WO WO 2010/006791 A1 1/2010

OTHER PUBLICATIONS

Handshake Website. Accessed Oct. 28, 2014. http://app-handshake.com/en/.
(Continued)

*Primary Examiner* — Nhan Le
(74) *Attorney, Agent, or Firm* — Wilson Sonsini Goodrich & Rosati

(57) ABSTRACT

Systems, apparatus, methods, and non-transitory media for programmatically associating nearby users are discussed herein. Some embodiments may include user-wearable gesture exchange device including a motion sensor and circuitry. The motion sensor may be configured to generate motion data values indicating motion of the gesture exchange device. The circuitry may be configured to monitor motion data values generated by the motion sensor for detection of a gesture exchange signature, such as a handshake, being performed by the user. In some embodiments, the gesture exchange device may be configured to establish a wireless communication connection with a second gesture exchange device for exchange of user data, such as in response to detecting user performance of the gesture exchange signature and/or determining that the second gesture exchange device is within a predetermined proximity.

9 Claims, 12 Drawing Sheets

(51) Int. Cl.
*H04W 4/00* (2018.01)
*G06F 3/01* (2006.01)

(58) Field of Classification Search
USPC ...... 455/41.2, 418–420, 422.1, 435.1, 435.2, 455/456.1, 456.6, 575.1, 575.6, 41.1
See application file for complete search history.

(56) References Cited

U.S. PATENT DOCUMENTS

| | | | |
|---|---|---|---|
| 2006/0256074 | A1 | 11/2006 | Krum et al. |
| 2009/0195497 | A1 | 8/2009 | Fitzgerald et al. |
| 2010/0174617 | A1 | 7/2010 | Cannon et al. |
| 2010/0321289 | A1 | 12/2010 | Kim et al. |
| 2012/0306770 | A1 | 12/2012 | Moore et al. |
| 2013/0042296 | A1* | 2/2013 | Hastings ............... G06F 21/10 726/1 |
| 2014/0025747 | A1 | 1/2014 | Sarkar et al. |
| 2014/0125590 | A1* | 5/2014 | Flagg ................... G06F 3/017 345/157 |
| 2014/0380187 | A1* | 12/2014 | Gardenfors ........... G06F 3/017 715/748 |
| 2015/0039880 | A1* | 2/2015 | Aminzade ........... H04L 41/0816 713/100 |
| 2015/0054748 | A1 | 2/2015 | Mason |
| 2015/0147968 | A1 | 5/2015 | Friedman et al. |

OTHER PUBLICATIONS

Hanley, et al. Automatic Handshake Contact Info Exchanger. Design Review for ECE 445, Senior Design, Spring 2013. Feb. 6, 2013.

International search report and written opinion dated Feb. 25, 2015 for PCT/US2014/066719.

Kanis, et al. Iband: a wearable device for handshake-augmented interpersonal information exchange.

Notice of allowance dated Nov. 20, 2015 for U.S. Appl. No. 14/088,315.

Office action dated Jul. 16, 2015 for U.S. Appl. No. 14/088,315.

Wu, et al. Cyber-Physical Handshake. SIGCOMM'11, Aug. 15-19, 2011. Toronto, Ontario, Canada. ACM 978-1-4503-0797-0/11/08, pp. 472-473.

* cited by examiner

SYSTEMS, APPARATUS, AND METHODS FOR PROGRAMMATICALLY ASSOCIATING NEARBY USERS

CROSS REFERENCE

This application is a Divisional Application which claims the benefit of U.S. application Ser. No. 14/088,315, filed Nov. 22, 2013, now U.S. Pat. No. 9,241,360, the disclosure of which is incorporated herein by reference in its entirety.

FIELD

Embodiments of the invention relate, generally, to techniques for programmatic sharing and management of user information.

BACKGROUND

Networking systems may allow users to connect with each other, such as to share information including profile information, contact information, newsfeeds, user posts, product and/or service information (e.g., for customer relationship management (CRM) systems), merchant information, event scheduling, advertising, user communications, among other things. Typically, to initiate a user connection (e.g., as a "friend" or "contact"), a user who meets a second user may be required to exchange business cards, contact information, or otherwise manually provide some form of user identifying data (e.g., name, account name, email address, phone number, etc.) of the second user to a system. In this and other regards, areas for improving current techniques have been identified.

BRIEF SUMMARY

Some embodiments may provide for a gesture exchange device including a motion sensor and circuitry. The motion sensor may be configured to generate motion data values indicating motion of the gesture exchange device. The circuitry may be configured to: determine a gesture exchange signature of a user; receive one or more motion data values from the motion sensor; determine a live gesture exchange signature of the user based on the one or more motion data values; determine whether the live gesture exchange signature matches the gesture exchange signature; and in response to determining that the live gesture exchange signature matches the gesture exchange signature, wirelessly send a user identifier associated with the user to a second device (e.g., a second gesture exchange device). For example, the user identifier may include a code generated by a central system that uniquely identifies a user and/or device.

In some embodiments, the circuitry may be further configured to: establish a wireless communication connection with a second gesture exchange device in response to determining that the live gesture exchange signature matches the gesture exchange signature; and wirelessly send the user identifier associated with the user to the second gesture exchange device. In some embodiments, a wireless communication connection may be established using a wireless personal area network (PAN) and/or a Bluetooth communication protocol. The circuitry may be configured to wirelessly send the user identifier to the second gesture exchange device using the wireless PAN and/or Bluetooth communication protocol.

In some embodiments, the circuitry may be further configured to configured to, subsequent to determining that the live gesture exchange signature matches the gesture exchange signature, wirelessly receive a second user identifier associated with a second user from a second gesture exchange device.

In some embodiments, the motion sensor configured to generate motion data values indicating motion of the gesture exchange device may include the motion sensor being configured to generate orientation data indicating orientation of the gesture exchange device.

In some embodiments, the circuitry configured to determine the gesture exchange signature may include the circuitry being configured to: receive a sequence of motion data values over time from the motion sensor; determine the gesture exchange signature based at least in part on the sequence of motion data values over time; store the gesture exchange signature in a memory; and access the gesture exchange signature from the memory.

In some embodiments, the circuitry configured to determine whether the live gesture exchange signature matches the gesture exchange signature may include the circuitry being configured to compare a sequence of live motion data values associated with the live gesture exchange signature with a sequence of historical motion data values associated with the gesture exchange signature.

In some embodiments, the circuitry may be further configured to: determine whether a second gesture exchange device is within a gesture exchange distance of the gesture exchange device; and in response to determining that the second gesture exchange device is within the gesture exchange distance of the gesture exchange device, establish a wireless communication connection with the second gesture exchange device. In some embodiments, the circuitry may be configured to determine whether the second gesture exchange device is within the gesture exchange distance of the gesture exchange device based at least in part on received signal strength of a wireless communication connection. Additionally or alternatively the gesture exchange device may include a proximity sensor. The circuitry configured to determine whether the second gesture exchange device is within the gesture exchange distance of the gesture exchange device may include the circuitry being configured to: receive one or more proximity data values from the proximity sensor; and determine whether the second exchange device is within the gesture exchange range of the gesture exchange device based at least in part on the one or more proximity data values.

Some embodiments may provide for a wearable device. The wearable device may include: a motion sensor configured to generate motion data values; a gesture detection module configured to detect performance of a gesture exchange signature based on the motion data values; and a gesture exchange module configured to wirelessly send a user identifier associated with the user in response to the gesture detection module detecting performance of the gesture exchange signature.

In some embodiments, the wearable device may further include a communications module configured to establish a wireless connection with a second device for data exchange and/or a proximity detection module configured to determine whether the second device is within a gesture exchange distance of the wearable device, and wherein the communications module is configured to establish the wireless connection with the second device in response to the proximity detection module determining that the second device is within the gesture exchange distance of the wearable device.

Some embodiments may provide for a machine-implemented method. They method may include: determine, by circuitry, a gesture exchange signature of a user; receiving one or more motion data values from a motion sensor; determining, by the circuitry, a live gesture exchange signature of the user based on the one or more motion data values; determining, by the circuitry, whether the live gesture exchange signature matches the gesture exchange signature; and in response to determining that the live gesture exchange signature matches the gesture exchange signature, wirelessly sending a user identifier associated with the user. For example, the user identifier may include a code generated by a central and may be configured to uniquely identify the gesture exchange device and/or user.

In some embodiments, the method may include: establishing a wireless communication connection with a second gesture exchange device in response to determining that the live gesture exchange signature matches the gesture exchange signature; and wirelessly sending the user identifier associated with the user to the second gesture exchange device.

In some embodiments, the method may include: establishing a wireless communication connection with a second gesture exchange device via a wireless personal area network (PAN) and/or using a Bluetooth communication protocol; and wirelessly sending the user identifier associated with the user to the second gesture exchange device via the wireless PAN and/or using the Bluetooth communication protocol.

In some embodiments, the method may include, subsequent to determining that the live gesture exchange signature matches the gesture exchange signature, wirelessly receiving a second user identifier associated with a second user from a second gesture exchange device.

In some embodiments, receiving the one or more motion data values from the motion sensor may include receiving orientation data indicating orientation of the gesture exchange device.

In some embodiments, determining the gesture exchange signature may include: receiving a sequence of motion data values over time from the motion sensor; determining the gesture exchange signature based at least in part on the sequence of motion data values over time; storing the gesture exchange signature in a memory; and accessing the gesture exchange signature from the memory.

In some embodiments, determining whether the live gesture exchange signature matches the gesture exchange signature includes comparing a sequence of live motion data values associated with the live gesture exchange signature with a sequence of historical motion data values associated with the gesture exchange signature.

In some embodiments, the method may further include: determining whether a second gesture exchange device is within a gesture exchange distance of the gesture exchange device; and in response to determining that the second gesture exchange device is within the gesture exchange distance of the gesture exchange device, establishing the wireless communication connection with the second gesture exchange device.

In some embodiments, determining whether the second gesture exchange device is within the gesture exchange distance of the gesture exchange device may include determining whether the second gesture exchange device is within the gesture exchange distance of the gesture exchange device based at least in part on received signal strength of a wireless communication connection. Additionally or alternatively, determining whether the second gesture exchange device is within the gesture exchange distance of the gesture exchange device may include: receiving one or more proximity data values from a proximity sensor; and determining whether the second exchange device is within the gesture exchange range of the gesture exchange device based at least in part on the one or more proximity data values.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
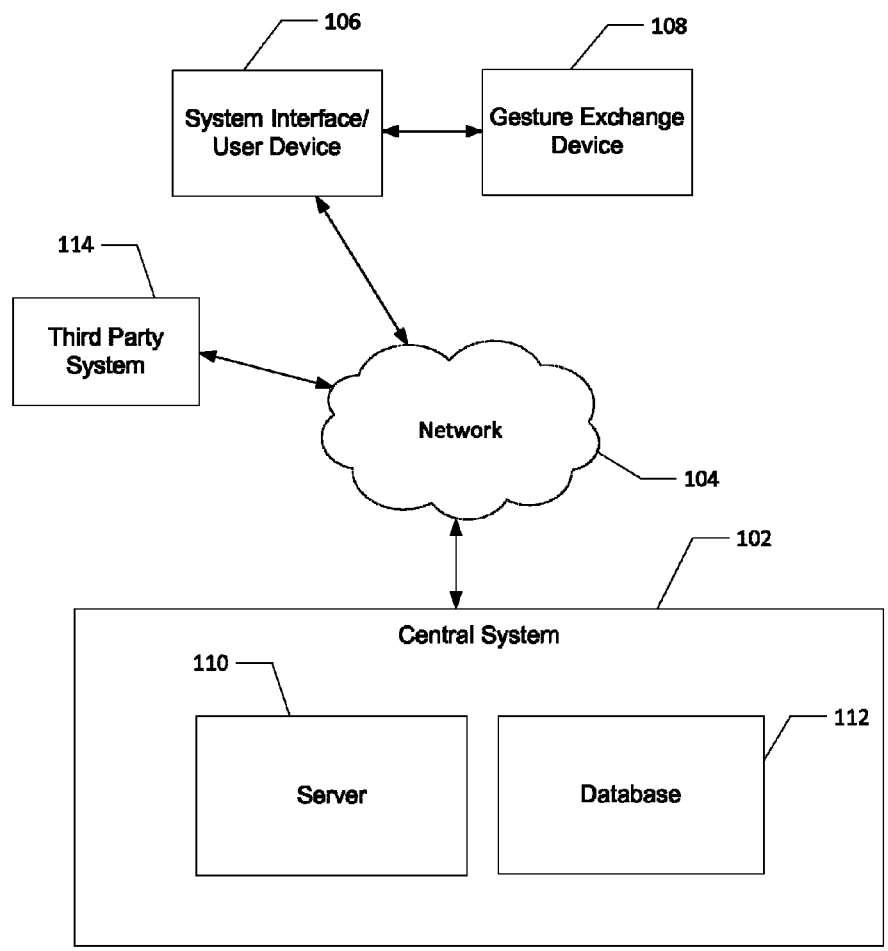
Figure 2:
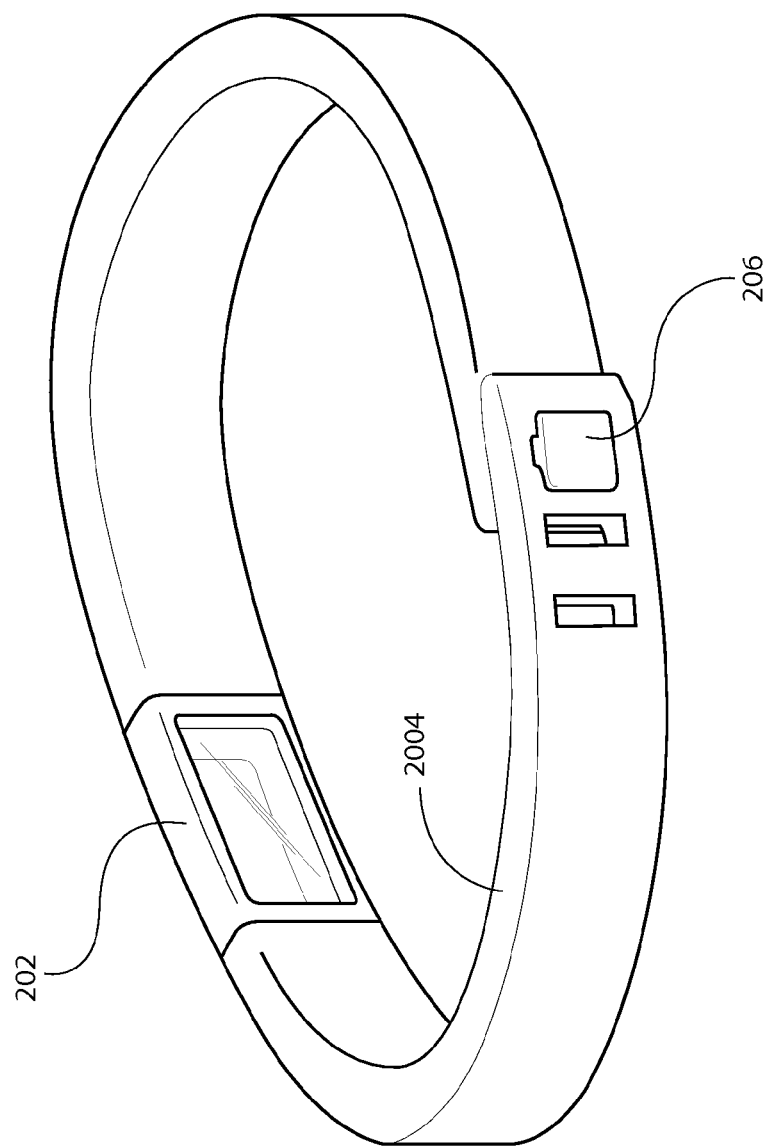
Figure 3:
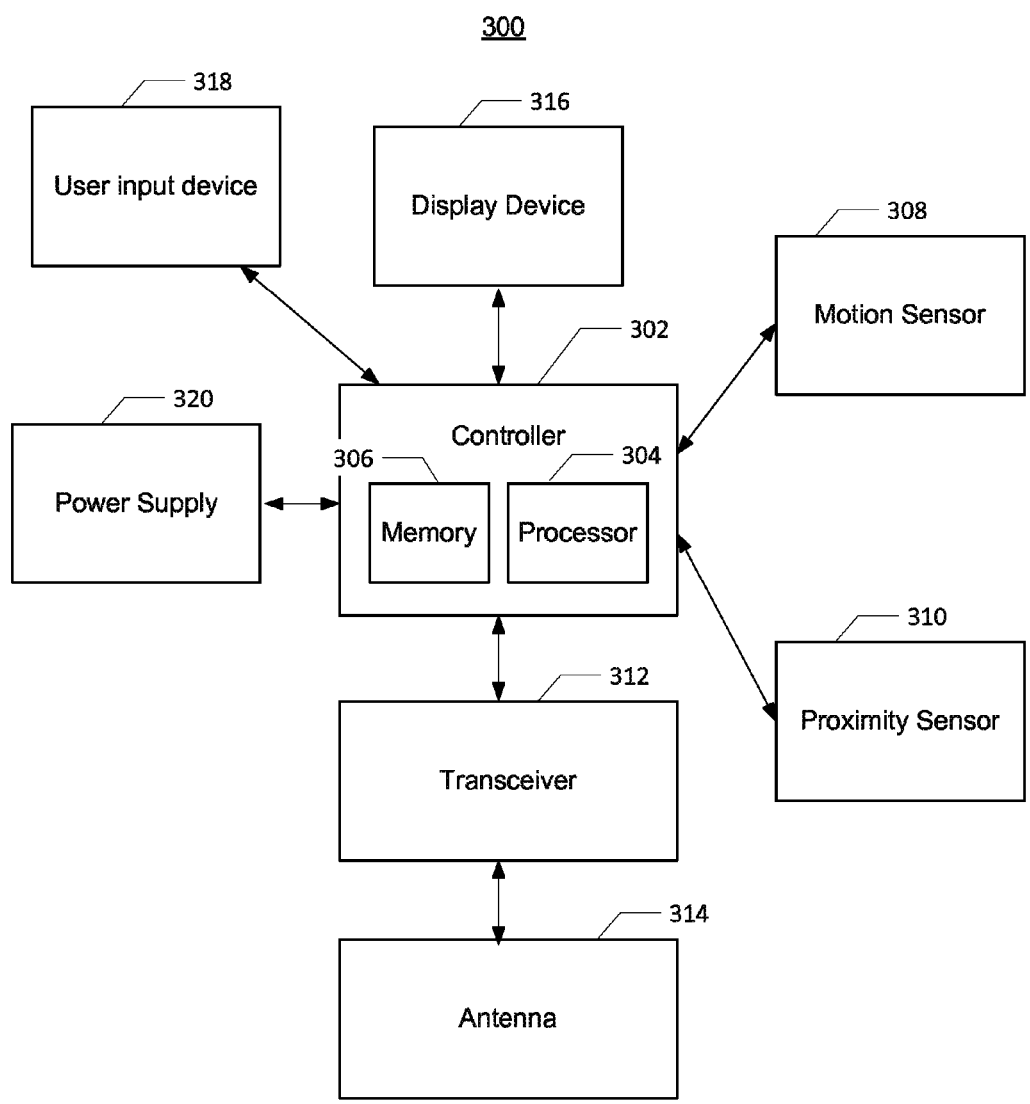
Figure 4:
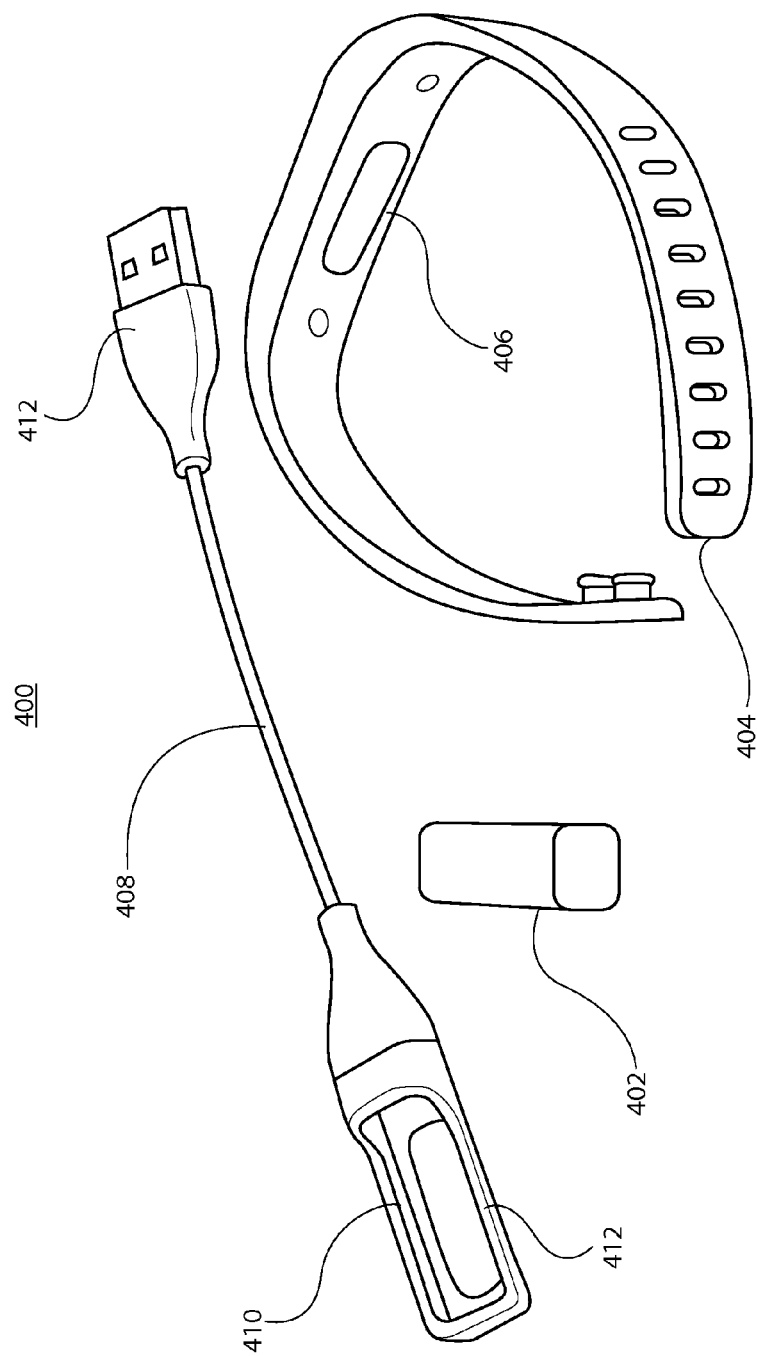
Figure 5:
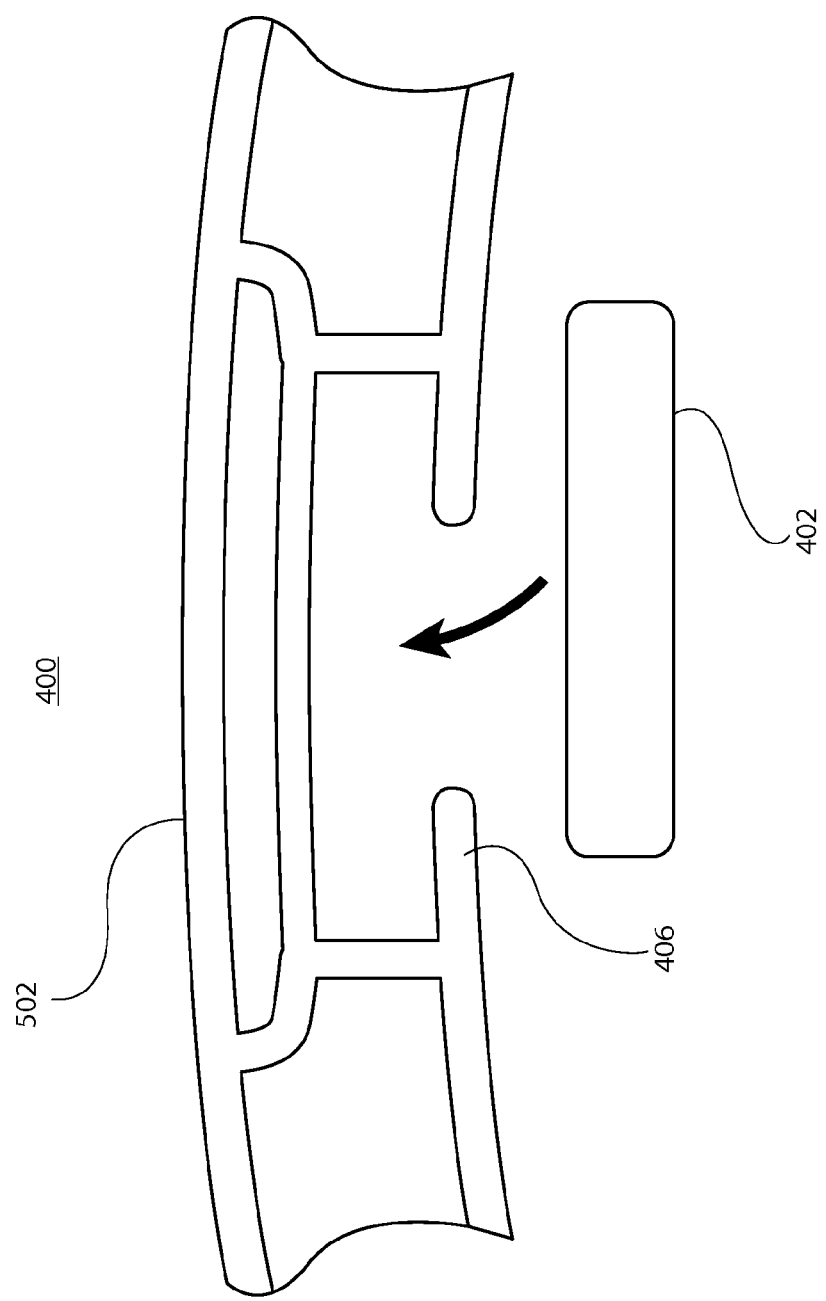
Figure 6:
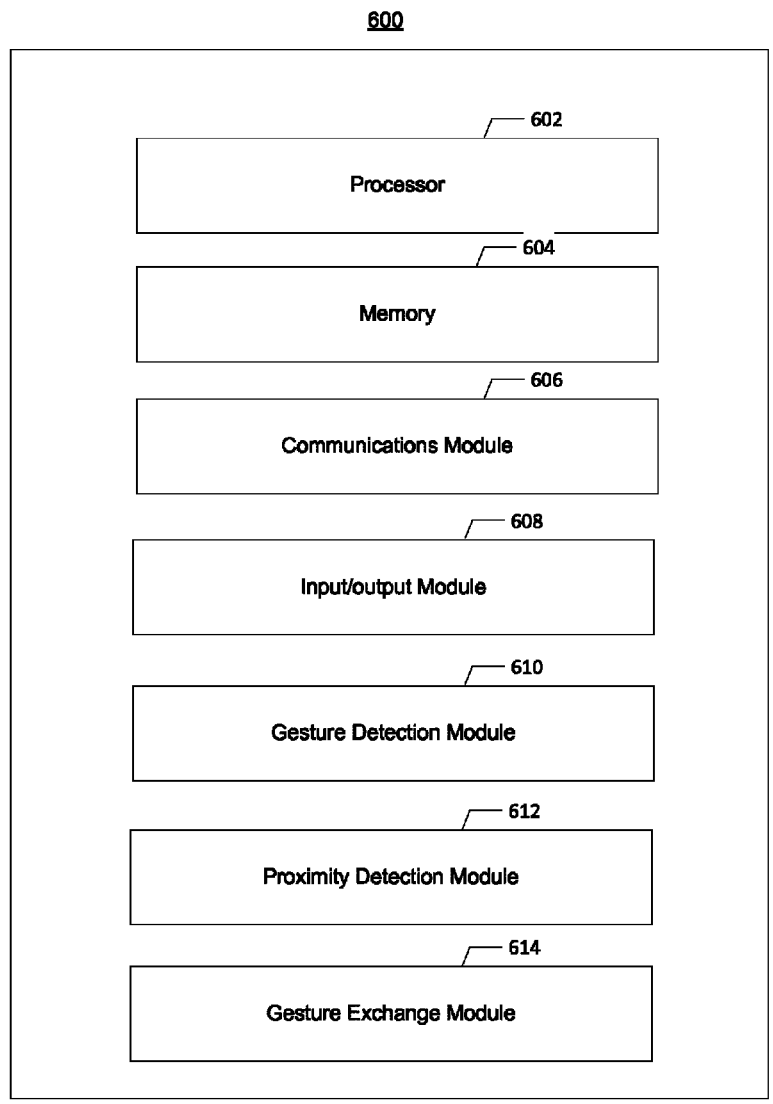
Figure 7:
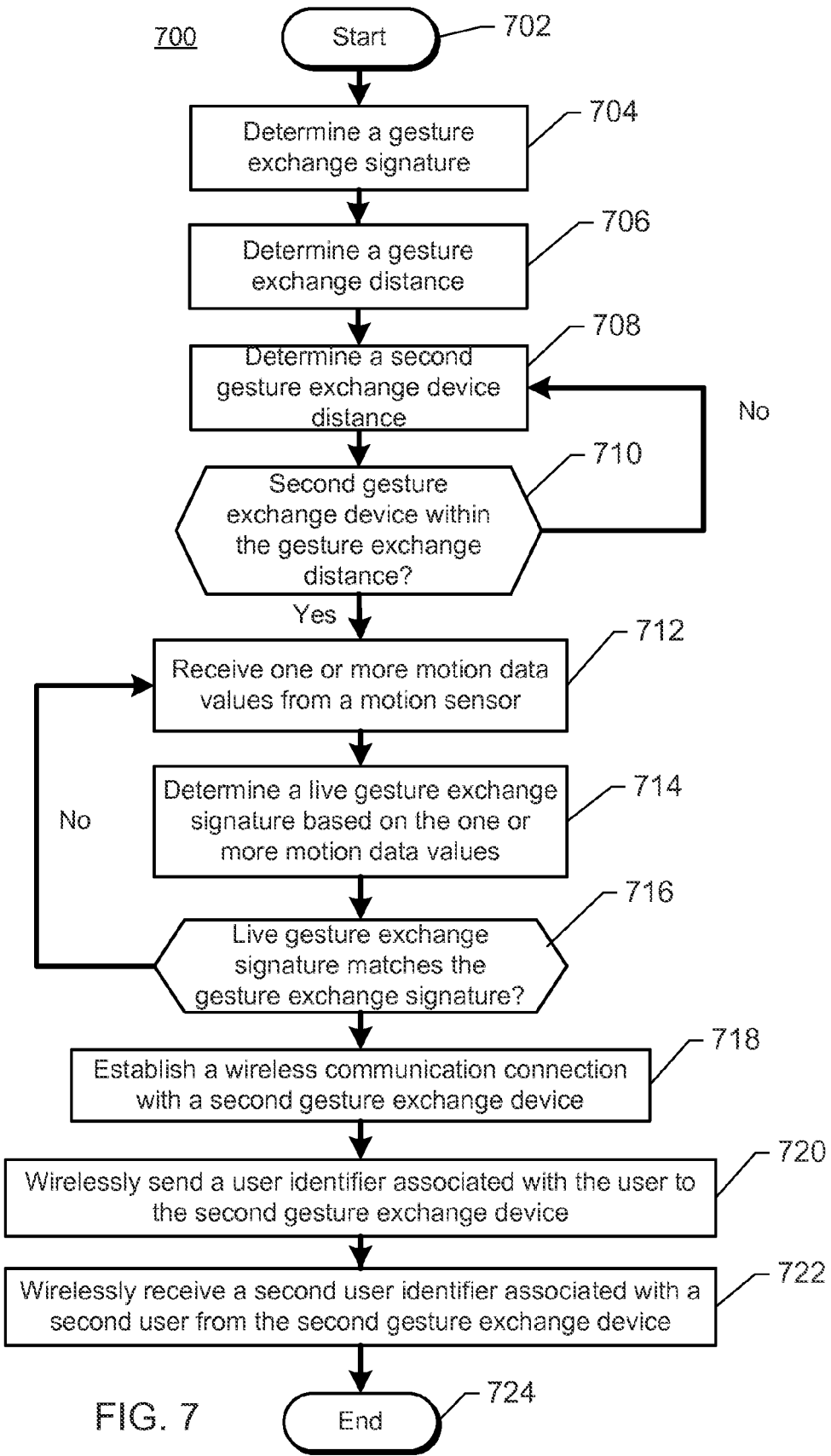
Figure 8:
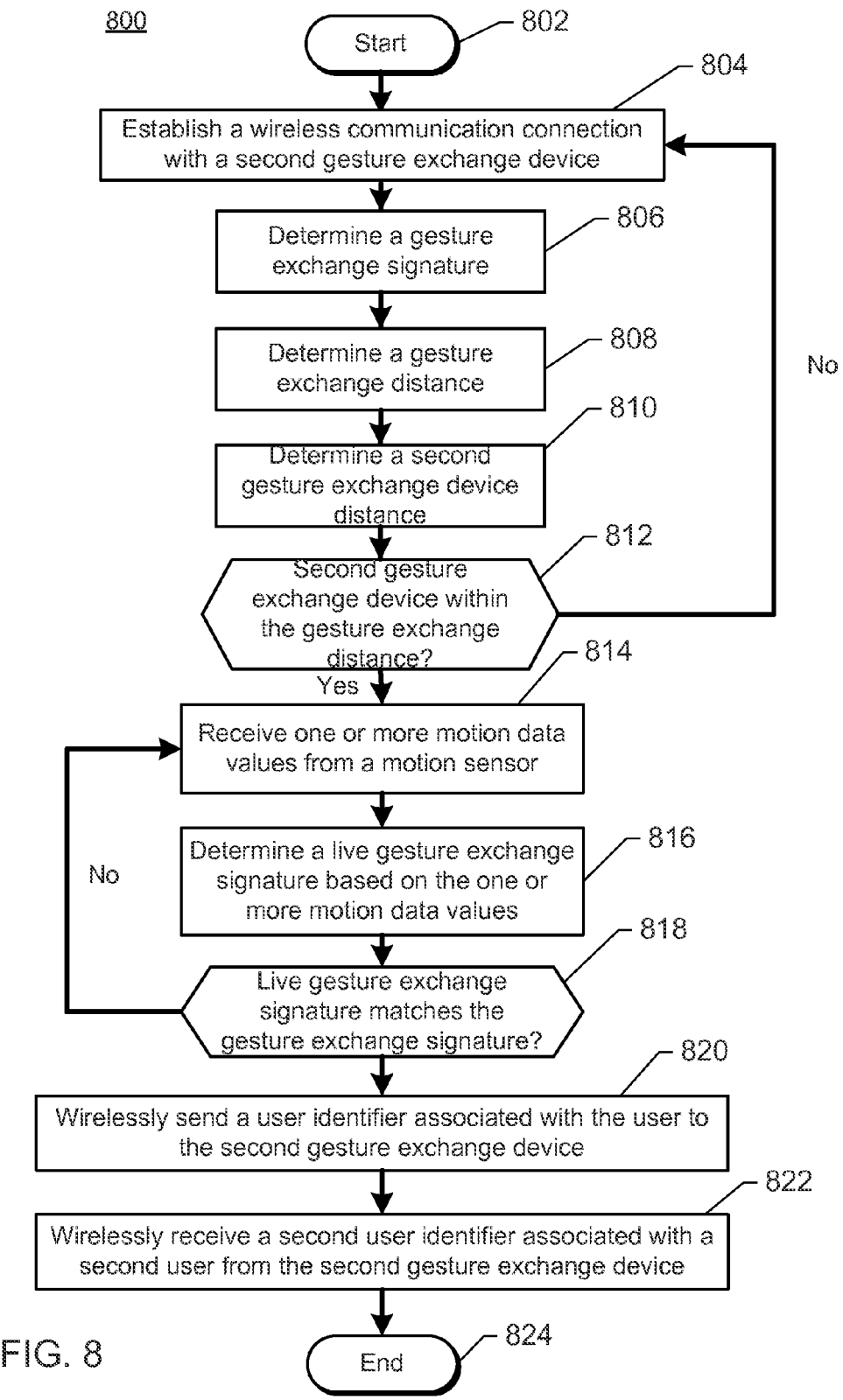
Figure 9:
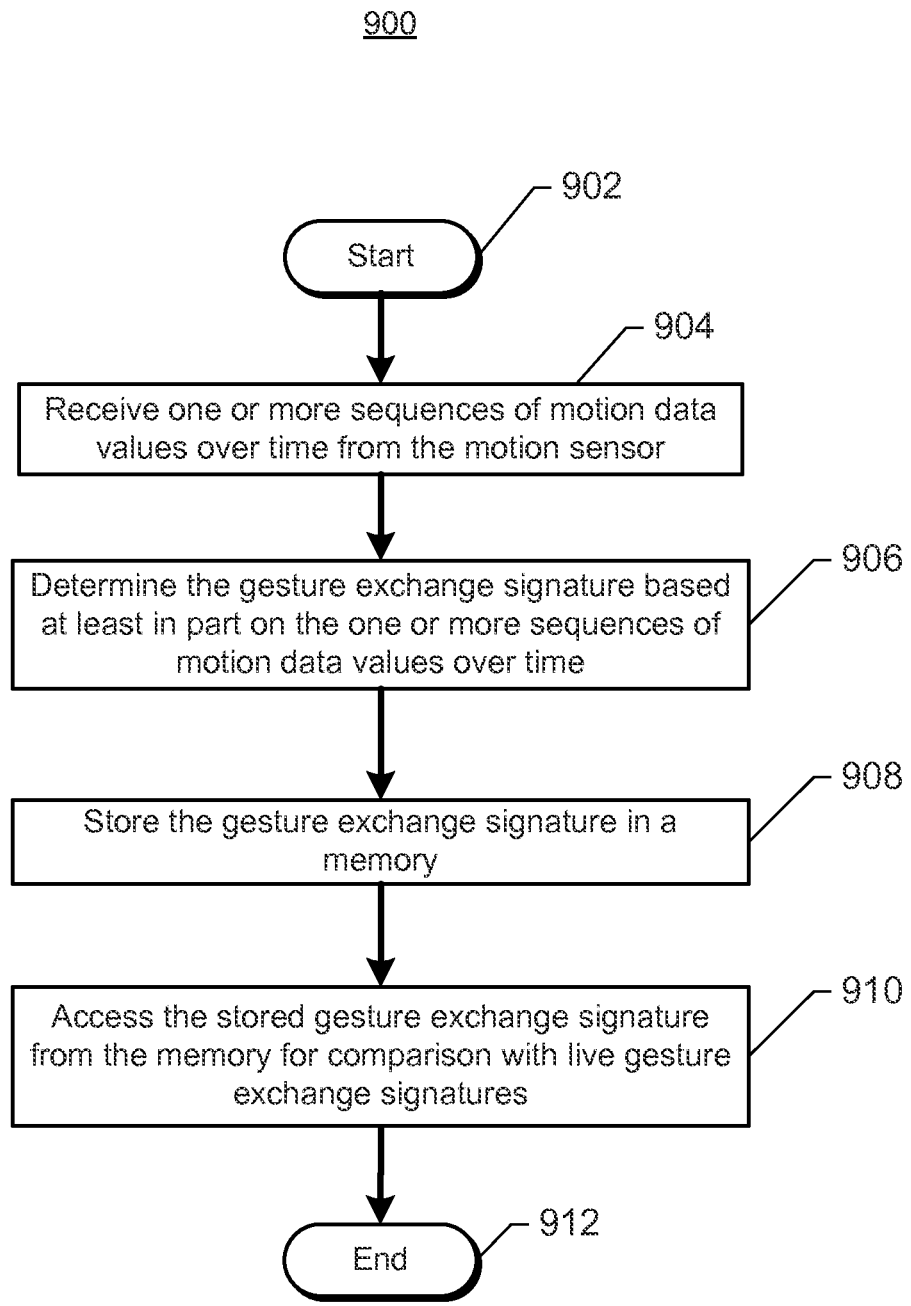
Figure 10:
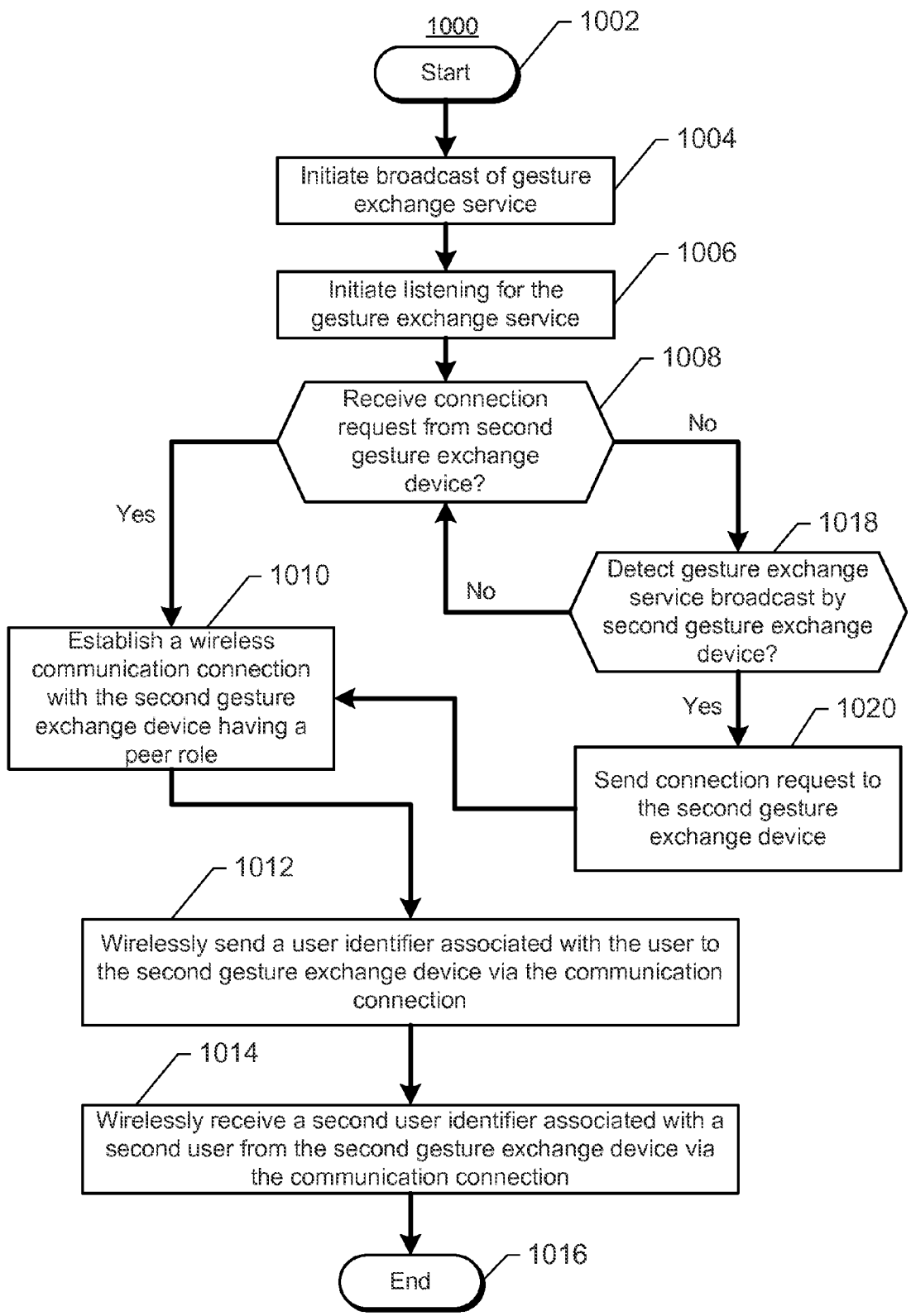
Figure 11:
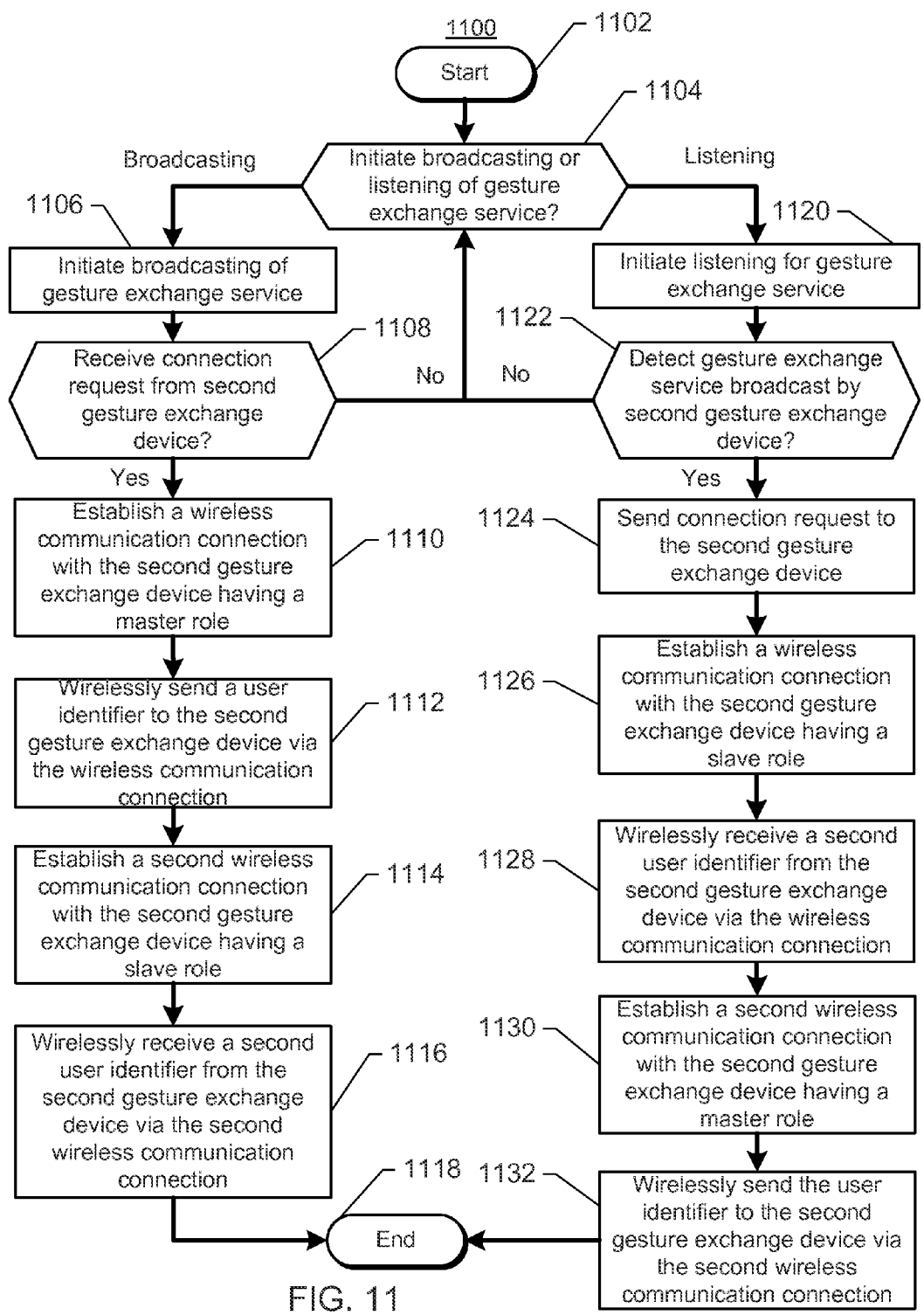
Figure 12:
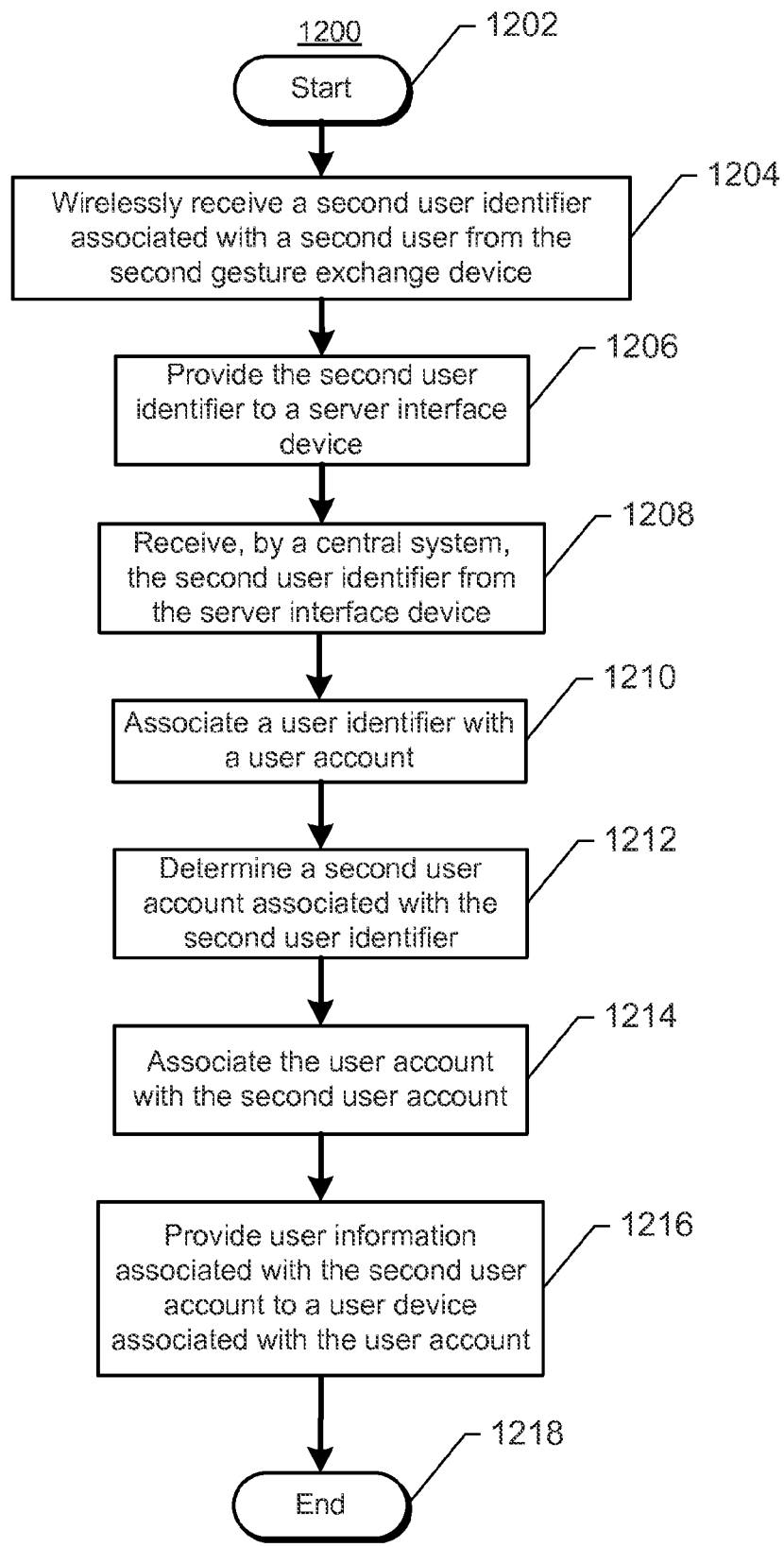

Having thus described some embodiments in general terms, reference will now be made to the accompanying drawings, which are not necessarily drawn to scale, and wherein:

FIG. 1 shows an example system, in accordance with some embodiments;

FIG. 2 shows an example gesture exchange device, in accordance with some embodiments;

FIG. 3 shows a schematic block diagram of an example gesture exchange device, in accordance with some embodiments;

FIG. 4 shows an example gesture exchange device, in accordance with some embodiments;

FIG. 5 shows a cross sectional view of an example gesture exchange device, in accordance with some embodiments;

FIG. 6 shows a schematic block diagram of example circuitry, in accordance with some embodiments;

FIG. 7 shows a flowchart of an example method for gesture-based data exchange, in accordance with some embodiments;

FIG. 8 shows a flowchart of an example method for gesture-based data exchange, in accordance with some embodiments;

FIG. 9 shows a flowchart of an example method for determining a gesture exchange signature, in accordance with some embodiments;

FIG. 10 shows a flowchart of an example method for establishing a wireless communication connection between gesture exchange devices, in accordance with some embodiments;

FIG. 11 shows a flowchart of an example method for establishing a wireless communication connection between gesture exchange device, in accordance with some embodiments; and FIG. 12 shows a flowchart of an example method for programmatically associating users, in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a device is described herein to receive data from another device, it will be appreciated that the data may be received directly from the another device or may be received indirectly via one or more intermediary devices, such as, for example, one or more servers, relays, routers, network access points, base stations, and/or the like, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, and/or the like.

As used herein, the term "method" refers to one or more steps that may be performed by a device, apparatus, system, circuitry, one or more processors, or the like. Where an example method is shown as including more than one step, it will be appreciated that the steps may be performed in different orders than as shown in the example and that not all steps are necessarily required. Furthermore, the methods are described herein as being performed by example structures for clarity and are not limited to those structures (e.g., a particular server, device, apparatus, etc.) in some embodiments.

Methods, systems, apparatus and computer program products described herein may be operable for programmatically associating users. For example, some embodiments may provide for a gesture exchange device that can be associated (e.g., via a registration and/or synchronization) with a user and/or user account of the user that is managed by a central system. The gesture exchange device including a motion sensor and (e.g., processing) circuitry. The motion sensor may be configured to generate motion data values and the gesture exchange device may be worn on the user (e.g., on the user's wrist) such that the motion data values indicate motion of the gesture exchange device and the user's arm/hand.

The circuitry may be configured to determine a gesture exchange signature of a user. The gesture exchange signature may indicate one or more motions (e.g., a handshake, wave, high five, etc.) that triggers the exchange of user data from the gesture exchange device to a second device, such as the second gesture exchange device. The circuitry may monitor motion data values from the motion sensor (e.g., live gesture exchange signatures) to detect a match with the gesture exchange signature. In response to determining that a live gesture exchange signature matches the gesture exchange signature, the gesture exchange device may be configured to send a user identifier associated with the user to the second gesture exchange device.

In some embodiments, the gesture exchange signature may be customized (e.g., in a calibration) and/or otherwise unique to the user. The gesture exchange signature may be preprogrammed or otherwise standardized such that two users can perform a shared gesture (e.g., a handshake) that triggers data exchange. In some embodiments, users may be allowed to set their own gesture exchange signatures. As such, data exchange can be accomplished via everyday hand gestures. The natural flow of in-person user interaction can be maintained while user contact information is programmatically exchanged in the background.

In some embodiments, gesture exchange devices may be configured to establish one or more wireless communication connections when two or more gesture exchange devices are within a communicable range. For example, the one or more wireless connections may be established via a wireless personal area network (PAN) and/or using a Bluetooth communication protocol. In some embodiments, where a low power communication protocol is used (e.g., Bluetooth 4.0 Low Energy), the gesture exchange device may be configured to perform master and slave roles for receiving and transmitting data at lower power levels, such as via two or more concurrently established wireless connections and/or sessions. Alternatively or additional, gesture exchange devices may be configured to perform peer roles via a single communication connection configured to provide low power two-way data transfer.

Some embodiments may provide for reduced signal interference and/or unwanted data exchanges. For example, the communication connection may be established subsequent to determining that the live gesture exchange signature matches the gesture exchange signature and/or subsequent to determining that the second gesture exchange device is within a gesture exchange distance (e.g., six inches) of the gesture exchange device. For example, the distance of the second gesture exchange device may be determined based on proximity data generated by a proximity sensor. In another example, a wireless communication connection may be established based on detecting the gesture exchange signature and signal strengths received from the second gesture exchange device via the communication connection may be used to determine the distance of the second gesture exchange device to trigger the sharing of user identifiers.

Some embodiments may provide for the creation and management of user accounts, contacts, and associated data. For example, a user and/or user identifier may be associated with a user account that may act as a universal electronic and/or online identity of the user. The user account may be associated with other user accounts of other users for a variety of purposes (e.g., lead generation/optimization, user data sharing, user communication, saving, developing, compiling, updating, maintaining, and/or prioritizing of contact lists and important relationships, etc.). For example, a central system may be configured to receive exchanged user identifiers that are stored by the gesture exchange device and associate user accounts based on received user identifiers. In some embodiments, the central system may further provide for connectivity and interoperability with some or all of a user's third party accounts.

Exemplary System Architecture

FIG. 1 shows an example system 100 in accordance with some embodiments. System 100 may include central system 102 (or "system 102"), network 104, system interface/user device 106, gesture exchange device 108, and third party system 114. System 102 may be communicably connected with system interface/user device 106 and/or third party system 114 via network 104.

Gesture exchange device 108 may be worn on, attached with, or otherwise carried by a user for exchange of user information with other users wearing gesture exchange devices 104. To avoid unnecessarily overcomplicating the disclosure, only a single gesture exchange device 108 is shown in FIG. 1. As discussed in greater detail below, when two gesture exchange devices 104 are within a communicable range (e.g., of a wireless personal area network (PAN)) and/or otherwise within a predetermined gesture exchange distance, two gesture exchange devices 104 may be configured to establish one or more wireless communication connections. Via the one or more wireless communication connections, a first gesture exchange device 108 may be configured to wirelessly send a user identifier to a second gesture exchange device 108 and/or receive a second user identifier from the second gesture exchange device 108.

Gesture exchange devices 108 may be configured to communicate directly with each other via the wireless PAN (e.g., in alternative or addition to network 104). For example, a gesture exchange device 108 may discover other gesture exchange devices 108 that are within the communicable range by broadcasting and/or listening for the gesture exchange service. In some embodiments, gesture exchange device 108 may be configured to utilize a Bluetooth standard for the communications via the wireless PAN, such as Bluetooth 4.0 Low Energy (LE).

In some embodiments, gesture exchange device 108 may be configured to determine a gesture exchange signature for the user associated with gesture exchange device 108. The gesture exchange signature, for example, may define one or more user movements (e.g., a handshake) that can be detected to provide a trigger condition for the exchange of the user identifier. Gesture exchange device 108 may be further configured to monitor the motion of the gesture exchange device 108 (e.g., using an accelerometer and/or other motion sensor configured to generate motion data values indicating motion of the gesture exchange device) to determine a live gesture exchange signature of the user. The live gesture exchange signature may be compared with the gesture exchange signature (e.g., stored in a memory of gesture exchange device 108) to determine whether the live gesture exchange signature matches and/or otherwise corresponds with the gesture signature exchange. In response to determining that the live gesture exchange signature matches and/or otherwise corresponds with the gesture exchange signature, gesture exchange device 108 may be configured to wirelessly send the user identifier associated with the user to the second gesture exchange device 108. Similarly, the second gesture exchange device 108 may be configured to provide the second user identifier to the gesture exchange device 108 in response to detecting that a live gesture exchange signature of the second user matches and/or otherwise corresponds with the second user's gesture exchange signature.

Gesture exchange device 108 may be communicably connected with system 102 to provide user identifiers received from other gesture exchange devices 108 to system 102 for user association, among other things. In some embodiments, gesture exchange device 108 may be communicably connected with system 102 via system interface/user device 106, such as via a wired (e.g., USB, Ethernet, pin connector, etc.) and/or wireless (e.g., Bluetooth, WiFi, etc.) connection.

System interface/user device 106 may be configured to provide a communication interface between gesture exchange device 108 and system 102. For example, subsequent to receiving one or more user identifiers, gesture exchange device 108 may be configured to synchronize with system interface/user device 106 to provide the one or more user identifiers to system interface/user device 106. System interface/user device 106 may include a mobile device and/or a stationary device. Example mobile devices may include user devices such as smartphones, tablets, laptops, portable media players, electronic readers, e-book devices, among other things. Example stationary devices may include user devices such as desktops, workstations, point-of-sale devices, among other things, and/or communication beacons or other dedicated user identifier receivers (e.g., that may be disposed within a monitored area such as at a tradeshow or conference where users are wearing gesture exchange devices 108). In some embodiments, such as when gesture exchange device 108 is configured to directly communicate with system 102 (e.g., via network 104), system interface/user device 106 may not be used and/or may be included with gesture exchange device 108.

In some embodiments, system 100 may further include central system 102, which may further include server 110 and database 112. In some embodiments, system 102 may be configured to provide networking service that is accessible via user device 106 (and/or gesture exchange device 108) and is operable to provide social networking functionality (e.g., friends, groups, events, newsfeeds, posts, messaging, etc.), contact information sharing, profile sharing, contact management, advertising, user communications, etc. to user device 106.

Server 110 may include circuitry, networked processors, etc. configured to perform some or all of the server-based processes described herein and may be any suitable network server and/or other type of processing device. For example, server 110 may be configured to provide user accounts, associate user accounts as (e.g., social and/or business) connected user accounts, provide user interfaces for managing (e.g., saving, developing, compiling, updating, maintaining, and/or prioritizing) user accounts, relationships, contact lists, information updates, business leads, and related data, etc. In some embodiments, system 102 may function as a "cloud" with respect to the user device 106 and/or gesture exchange device 108. In that sense, server 110 may include several servers performing interconnected and/or distributed functions. To avoid unnecessarily overcomplicating the disclosure, server 110 is shown and described herein as a single server.

Database 112 may include any suitable network storage device. For example, database 112 may be configured to store user data (e.g., user identifying data, user account information, login information, profile information, contact information, preferences, user consumer behavior, among other things), connected user information (e.g., user data associated with a connected user), user identifiers that uniquely identify users, gesture exchange devices, and/or user accounts, among other things. As such, database 112 may include, for example, one or more database systems, backend data servers, network databases, cloud storage devices, etc. To avoid unnecessarily overcomplicating the disclosure, database 112 is shown and described herein as a single database.

In some embodiments, database 112 may include a universal database of users, user identifiers and/or user accounts. The universal database may be configured to provide users with a persistent electronic identity that can be used across multiple platforms and/or third party systems. For example, each user may be associated with a user identifier and/or user account. A user may also be associated with a personalized contact list of connected users, user identifiers and/or user accounts.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Third party system 114 may be configured to provide third party social networking services, customer relationship management (CRM) services, financial services, messaging services (e.g., email, short messaging service (SMS) text, etc.), among other things. In some embodiments, system 102 may be configured to integrate user identifiers, user accounts, contact information, etc. with (e.g., preexisting) third party networking and/or communication platforms.

FIG. 2 shows an example gesture exchange device 200, in accordance with some embodiments. As discussed above, a gesture exchange device may be configured to be worn by a user, such as on the user's wrist when the gesture exchange signature is defined by a handshake and/or other hand or arm movement gesture. Gesture exchange device 200 may include electronic device 202 and wrist strap 204. Electronic device 202 may include the electronic hardware and/or circuitry of gesture exchange device 200, and is discussed in greater detail with respect to FIGS. 3-5. Wrist strap 204 may be configured to secure gesture exchange device 200 to the user's wrist. In some embodiments, wrist strap 204 may include buckle 206 configured to provide adjustable sizes for wrist strap 204 such that wrist strap 204 can be customized to the size of the user's wrist. Wrist strap 204 may include and/or be constructed of thermoplastic polyurethane (TPU) and/or other durable and flexible material that does not (e.g., substantially) interfere with wireless communication signals.

FIG. 3 shows a schematic block diagram of an example gesture exchange device 300, in accordance with some embodiments. Gesture exchange device 300 may include controller 302 (including processor 304 and memory 306), motion sensor 308, proximity sensor 310, transceiver 312, antenna 314, display device 316, user input device 318, and power supply 320. In some embodiments, gesture exchange device 300 may include a crystal oscillator, or the like, that records time and/or synchronizes the electronics of gesture exchange device 300. Gesture exchange device 300 may also include a voltage regulator configured to maintain a constant voltage to the circuitry. In some embodiments, some or all of these components may be included within or otherwise mechanically attached with a housing that defines the electronic device portion of gesture exchange device 300.

Controller 302 may be configured to perform some or all of the processing discussed herein with respect to gesture-recognition, data transfer, among other things, for gesture exchange device 300. In some embodiments, user identifiers and/or other data exchanged via gesture exchange devices may be stored within memory 306 and accessed by processor 304 for data exchanges. Received user identifiers and/or other data may also be stored in memory 306 for subsequent synchronization with system interface/user device 106 and/or gesture exchange device 108. In some embodiments, memory 306 may include a 128 kB flash memory. In some embodiments, processor 304 may include an ultra-low-power ARM architecture and/or other reduced instruction set computing (RISC) architecture. In some embodiments, processor 304 may include processing speeds of 16-32 Mhz for sufficiently quick processing at low power consumption levels.

Motion sensor 308 may be configured to generate motion data values indicating motion of gesture exchange device 300. The motion data values may be sent to controller 302 to generate gesture exchange signatures and/or live gesture exchange signatures. In some embodiments, motion sensor 308 may include an accelerometer, such as a three axis accelerometer. The three axis accelerometer may be configured to provide motion data values indicating three dimensional motions, such as an X axis acceleration magnitude value, a Y axis acceleration magnitude value, and a Z axis magnitude value. Sets of axis magnitude values may be captured (e.g., over time) by motion sensor 308 and sent to controller 302 for processing. In some embodiments motion sensor 308 may include 6D/4D orientation detection, such as a gyroscope configured to generate motion data values including orientation data indicating orientation of gesture exchange device 300.

Proximity sensor 310 may be configured to remotely detect the presence of other nearby users and/or gesture exchange devices. Proximity sensor 310 may be configured to emit electromagnetic signals and to determine changes in return signals caused by the presence of a nearby user and/or gesture exchange device. Any suitable proximity sensor technology may be used including infrared, capacitive, inductive, near field communication (NFC), etc. In some embodiments, proximity data generated by proximity sensor 310 may be used to determine the distance that a nearby user and/or gesture exchange device is away from gesture exchange device 300 for comparison with the gesture exchange distance.

Transceiver 312 and antenna 314 may be configured to provide wireless communication connections, including the wireless communication connections with a second gesture exchange device via a wireless PAN. Transceiver 312 may be configured to generate an electronic signal including data to be transmitted (e.g., the user identifier) and to provide the electronic signal to antenna 314 for wireless transmission of the electronic signal. Transceiver 312 may be further configured to receive wireless transmissions from detected by antenna 314 and to provide received electronic signals (e.g., including a user identifier of a second user) generated based on the wireless transmissions to controller 302. In some embodiments, transceiver 312 may include a separate transmitter and/or receiver.

In some embodiments, transceiver 312 and/or antenna 314 may be leveraged to determine the distance that a nearby gesture exchange device is away from gesture exchange device 300. For example, the distance may be determined based at least in part on received signal strength of one or more wireless communication connections formed via the wireless PAN between gesture exchange device 300 and the nearby gesture exchange device. Here, proximity sensor 310 may be omitted from gesture exchange device 300 and/or may be used for auxiliary and/or backup distance determination.

Display device 316 may be configured to provide visual displays and/or interactive displays. In some embodiments, display device 316 may include a multi-color light-emitting diode (LED) display and/or a segment display. In some embodiments, display device 316 may include a video display. Virtually any information that is available to controller 302 may be presented to the user via display device 316. For example, display device 316 may be configured to provide an indication of battery status, memory usage, data exchange confirmation, event notification, etc. In some embodiments, gesture exchange device 300 may additionally or alternatively include an audio device configured to provide auditory notifications and/or indications.

User input device 318 may be configured to receive user inputs and to provide user input data generated based on the user inputs to controller 302. User input device may include a button, switch, key, touch pad, touch sensor, microphone, etc. The user input data may be configured to control gesture exchange device 300 to perform a variety of functionalities such as device activation/deactivation, contact synchronization, on demand contact addition/deletion, etc.

Power supply 320 may be configured to provide power to one or more (e.g., all) of the power consuming components of gesture exchange device 300. In some embodiments, power supply 320 may include an 80-110 milliamp hour (mAh) battery.

FIG. 4 shows an example gesture exchange device 400, in accordance with some embodiments. Gesture exchange device 400 may include electronic device 402, wrist strap 404, and synchronization device 408. Electronic device 402 may include a housing that includes some or all of the electrical components of the gesture exchange device (e.g., as shown in FIG. 3).

In some embodiments, wrist strap 404 may define an electronic device receiving area 406 in which electronic device 402 may be removably inserted for data exchange with other gesture exchange devices. Electronic device 402 may be removed from electronic device receiving area 406 for synchronization, battery recharge, etc. FIG. 5 shows a cross sectional view of gesture exchange device 400, in accordance with some embodiments. Electronic device receiving area 406 may include (e.g., frosted) glass cover 502 that protects and visually exposes the display device (e.g., display device 316) of electronic device 402 when electronic device 402 is inserted within electronic device receiving area 406.

Returning to FIG. 4, when gesture exchange device is configured to interface with system interface/user device 106 for synchronization via a wired connection, synchronization device 408 may also be included. Synchronization device 408 may include electronic device interface 410 and user device interface 106. In some embodiments, electronic device interface 410 may include electronic device receiving area 412 configured to securely hold electronic device 402 to synchronization device 410. Electronic device interface 410 and user device interface 106 are shown in FIG. 4 as being configured to use USB connectors and protocols, although one or more other data and/or power protocols may be used (e.g., pin connectors, Ethernet, etc.). Additionally or alternatively, electronic device interface 410 and user device interface 106 may be configured to use different protocols and/or connectors. Here, synchronization device 408 may further include an adapter and/or protocol converter. In some embodiments, synchronization between gesture exchange device 400 and system interface/user device 106 may alternatively or additionally used a wireless connection and one or more suitable wireless protocols (e.g., Bluetooth, Wifi, etc.).

FIG. 6 shows a schematic block diagram of example circuitry 600, some or all of which may be included in gesture exchange device 108, system interface/user device 106, system 102, server 110, database 112, and/or third party system 114. In accordance with some example embodiments, circuitry 600 may include various means, such as one or more processors 602, memories 604, communications modules 606, and/or input/output modules 608.

In some embodiments, such as when circuitry 600 is included in gesture exchange device 108, gesture detection module 610, proximity detection module 612, and/or gesture exchange module 614 may also or instead be included. As referred to herein, "module" includes hardware, software and/or firmware configured to perform one or more particular functions. In this regard, the means of circuitry 600 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 604) that is executable by a suitably configured processing device (e.g., processor 602), or some combination thereof.

Processor 602 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 6 as a single processor, in some embodiments, processor 402 may comprise a plurality of processing means. The plurality of processing means may be embodied on a single computing device or may be distributed across a plurality of computing devices collectively configured to function as circuitry 600. The plurality of processing means may be in operative communication with each other and may be collectively configured to perform one or more functionalities of circuitry 600 as described herein. In an example embodiment, processor 602 may be configured to execute instructions stored in memory 604 or otherwise accessible to processor 602. These instructions, when executed by processor 602, may cause circuitry 600 to perform one or more of the functionalities described herein.

Whether configured by hardware, firmware/software methods, or by a combination thereof, processor 602 may comprise an entity capable of performing operations discussed herein while configured accordingly. Thus, for example, when processor 602 is embodied as an integrated circuit, ASIC, FPGA or the like, processor 602 may comprise specifically configured hardware for conducting one or more operations described herein. As another example, when processor 602 may be embodied as an executor of instructions, such as may be stored in memory 604, the instructions may specifically configure processor 602 to perform one or more algorithms, methods or operations described herein. For example, processor 602 may be configured to execute operating system applications, firmware applications, media playback applications, media editing applications, among other things.

Memory 604 may comprise, for example, volatile memory, non-volatile memory, or some combination thereof. Although illustrated in FIG. 6 as a single memory, memory 604 may comprise a plurality of memory components. The plurality of memory components may be embodied on a single computing component or distributed across a plurality of computing components. In various embodiments, memory 604 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 604 may be configured to store information, data, applications, instructions, or the like for enabling circuitry 600 to carry out various functions in accordance with example embodiments discussed herein. For example, in at least some embodiments, memory 604 may be configured to buffer input data for processing by processor 602. Additionally or alternatively, in at least some embodiments, memory 604 may be configured to store program instructions for execution by processor 602 and/or data for processing by processor 602. Memory 604 may store information in the form of static and/or dynamic information. This stored information may be stored and/or used by circuitry 600 during the course of performing its functionalities.

Communications module 606 may be embodied as any component or means embodied in circuitry, hardware, a computer program product comprising computer readable program instructions stored on a computer readable medium (e.g., memory 604) and executed by a processing device (e.g., processor 602), or a combination thereof that is configured to receive and/or transmit data from/to another device, such as, for example, a second circuitry 600 and/or the like. In some embodiments, communications module 606 (like other components discussed herein) can be at least partially embodied as or otherwise controlled by processor 602. In this regard, communications module 606 may be in communication with processor 602, such as via a bus. Communications module 606 may include, for example, an antenna, a transmitter, a receiver, a transceiver, network interface card and/or supporting hardware and/or firmware/software for enabling communications. Communications module 606 may be configured to receive and/or transmit any data that may be stored by memory 604 using any protocol that may be used for communications. Communications module 606 may additionally and/or alternatively be in communication with the memory 604, input/output module 608 and/or any other component of circuitry 600, such as via a bus. Communications module 606 may be configured to use one or more communications protocols such as, for example, Bluetooth, Wi-Fi (e.g., a 802.11 protocol, etc.), radio frequency systems (e.g., 900 MHz, 1.4 GHz, and 5.6 GHz communication systems), infrared, mobile broadband, GSM, GSM plus EDGE, CDMA, quadband, and other cellular protocols, VOIP, and/or any other suitable protocol. In some embodiments, such as when circuitry 600 is embodied as a gesture exchange device and/or system interface/user device, communications module 606 may be configured to generate a wireless PAN for communication with other devices within communicable range of the wireless PAN and establish one or more communication connections via the wireless PAN.

Input/output module 608 may be in communication with processor 602 to receive an indication of an input and/or to provide an audible, visual, mechanical, or other output. In that sense, input/output module 608 may include means for performing analog-to-digital and/or digital-to-analog data conversions. Input/output module 608 may include support, for example, for a display device, touch sensor, keyboard, button, click wheel, mouse, joystick, image capturing device, microphone, speaker, biometric scanner, motion sensor, proximity sensor, and/or other input/output mechanisms. In embodiments where circuitry 600 may be implemented as a server or database, aspects of input/output module 608 may be reduced as compared to embodiments where circuitry 600 may be implemented as an end-user machine or other type of device designed for complex user interactions. In some embodiments (like other components discussed herein), input/output module 608 may even be eliminated from circuitry 600. Alternatively, such as in embodiments wherein circuitry 600 is embodied as a server or database, at least some aspects of input/output module 608 may be embodied on an apparatus used by a user that is in communication with circuitry 600. Input/output module 608 may be in communication with memory 604, communications module 606, and/or any other component(s), such as via a bus. Although more than one input/output module and/or other component can be included in circuitry 600, only one is shown in FIG. 6 to avoid overcomplicating the disclosure (e.g., like the other components discussed herein).

In some embodiments, gesture detection module 610, proximity detection module 612, and/or gesture exchange module 614 may also or instead be included and configured to perform the functionality discussed herein related to respectively detecting user performance of a gesture exchange signature, detecting proximity of a second (e.g., gesture exchange) device and/or user, and gesture-based data exchange. In some embodiments, some or all of the functionality of gesture detection module 610, proximity detection module 612, and/or gesture exchange module 614 may be performed by processor 602. In this regard, the example processes and algorithms discussed herein can be performed by at least one processor 602, gesture detection module 610, proximity detection module 612, and/or gesture exchange module 614. For example, non-transitory computer readable storage media can be configured to store firmware, one or more application programs, and/or other software, which include instructions and other computer-readable program code portions that can be executed to control processors of the components of circuitry 600 to implement various operations, including the examples shown above. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 602, to produce a machine, such that the computer program product includes the instructions which execute on the computer or other programmable data processing apparatus to create a means for implementing the functions specified in the flowchart block or block diagrams.

These computer program instructions may also be stored in a non-transitory computer-readable storage device (e.g., memory 604) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Gesture-Based Data Exchange

FIGS. 7-12 show flowcharts of example methods 700-1200. Methods 700-1200 are discussed herein with reference to FIGS. 1-5, although other suitable computing devices and/or systems may be used in various embodiments.

FIG. 7 shows a flowchart of an example method 700 for gesture-based data exchange, in accordance with some embodiments. Method 700 may be performed to exchange user data (e.g., user identifiers) between two or more gesture exchange devices, or from/to a gesture exchange device and a second device. To avoid unnecessarily overcomplicating the disclosure, the second device will be hereinafter referred to as a second gesture exchange device.

Method 700 may begin at 702 and proceed to 704, where the gesture exchange device (e.g., circuitry of the gesture exchange device, processor 602, and/or gesture exchange module 614) may be configured to determine a gesture exchange signature. The gesture exchange signature may define a gesture, user motion, or the like, that when detected may serve as an indication of user intent to trigger a transfer of data via the gesture exchange device. For example, the gesture exchange signature may be determined based on motion data values generated by a motion sensor of the gesture exchange device, such as motion sensor 308 shown in FIG. 3 for gesture exchange device 300.

In some embodiments, a gesture exchange signature may be customizable and/or adaptable to the user of the gesture exchange device. For example, the gesture exchange signature may be determined during a calibration process where the user is requested to perform a gesture while wearing the gesture exchange device. Alternatively or additionally, the gesture exchange signature may be programmatically updated and/or recalibrated, such as in response to a user command, in the course of providing a gesture exchange service, at predetermined times, at initialization of the gesture exchange service, etc. Additional examples regarding the determination of the gesture exchange signature of a user, applicable in some embodiments, are discussed below with respect to method 800 shown in FIG. 8.

At 706, the gesture exchange device may be configured to determine a gesture exchange distance. The gesture exchange distance may define a maximum distance away from the gesture exchange device that the second gesture exchange device may be located for initiation of data transfer. In some examples, the gesture exchange distance may be set to 6 inches to reduce interference from other devices that are outside of the gesture exchange distance.

At 708, the gesture exchange device (e.g., circuitry of the gesture exchange device, processor 602, and/or proximity detection module 612) may be configured to determine a second gesture exchange device distance. The second gesture exchange device distance may define a distance that the second gesture exchange device is away from the gesture exchange device.

In some embodiments, the gesture exchange distance may be different (e.g., less) than the communicable range of the wireless PAN. For example, the gesture exchange distance may be set to 6 inches and the communicable range of the wireless PAN may be set to a 1 foot radius. Here, other devices within the communicable range of the wireless PAN but outside of the gesture exchange distance may be ignored and/or filtered (e.g., via time-stamping, direction, etc.) to reduce interference, unintended data exchange, power consumption, etc. For example, time-stamping may be used to match the beginning and end of a handshake and/or correlate the time between two gesture exchange devices. Direction may be used to determine that two gesture exchange devices are pointing 180 degrees from each other and/or correlate the angle displacement between the two users. In some embodiments, a gesture exchange distance may not be used (e.g., as a trigger for data transfer) or may be the same as the communicable range of the wireless PAN.

In some embodiments, second gesture exchange device distance may be determined based on proximity data generated by a proximity sensor, such as proximity sensor 310 of gesture exchange device 300. As discussed above, the proximity sensor may be configured to emit electromagnetic signals and to determine changes in return signals caused by the presence of a nearby user and/or gesture exchange device and any suitable proximity sensor technology may be used including infrared, capacitive, inductive, near field communication (NFC). In some embodiments, the gesture exchange distance may be defined by the detection range of the proximity sensor, such as where the proximity sensor is of a type capable of detecting presence within a limited range but not a particular distance. The gesture exchange device may be configured to determine that second gesture exchange device is within the gesture exchange distance based on whether the presence of the second gesture exchange device has been detected by the proximity sensor.

At 710, the gesture exchange device may be configured to determine whether the second gesture exchange device is within the gesture exchange distance of the gesture exchange device. For example, the gesture exchange device may be configured to compare the determined second gesture exchange device distance with the gesture exchange distance to determine whether the second gesture exchange device is within the gesture exchange distance.

In response to determining that the second gesture exchange device is not within the gesture exchange distance of the gesture exchange device, method 700 return to 708, where the gesture exchange device may be configured to monitor changes in the second gesture exchange device distance for comparison with the gesture exchange distance. The gesture exchange device may be additionally or alternatively configured to determine distances of one or more other gesture exchange devices.

In response to determining that the second gesture exchange device is within the gesture exchange distance of the gesture exchange device, method 700 may proceed to 712, where the gesture exchange device (e.g., circuitry of the gesture exchange device, processor 602, and/or gesture detection module 610) may be configured to receive one or more motion data values from the motion sensor (e.g., motion sensor 308). In some embodiments, the gesture exchange device may be configured to monitor motion data values generated by the motion sensor while the gesture exchange device is worn by the user, such as on the user's wrist via wrist strap 204. Accordingly, user arm/hand movements may be captured by the motion sensor as the motion data values and different movements may correspond with different motion data values.

At 714, the gesture exchange device (e.g., circuitry of the gesture exchange device, processor 602, and/or gesture detection module 610) may be configured to determine a live gesture exchange signature based on the one or more motion data values. The live gesture signature may be determined based on the one or more motion data values using the same and/or similar algorithm(s) used at 704 to determine the (e.g., stored) gesture exchange signature, as discussed in greater detail below with respect to method 900 and FIG. 9.

At 716, the gesture exchange device (e.g., circuitry of the gesture exchange device, processor 602, and/or gesture detection module 610) may be configured to determine whether the live gesture exchange signature matches the gesture exchange signature. A live gesture exchange signature may be determined to "match" a gesture exchange signature when the live gesture exchange signature is substantially similar and/or otherwise corresponds with the gesture exchange signature.

In response to determining that the live gesture exchange signature fails to match the gesture exchange signature, method 700 may return to 712, where the gesture exchange device may be configured to continue receiving one or more motion data values from the motion sensor.

In response to determining that the live gesture exchange signature matches the gesture exchange signature, method 700 may proceed to 718, where the gesture exchange device (e.g., circuitry of the gesture exchange device, processor 602, and/or gesture exchange module 614) may be configured to establish a wireless communication connection with a second gesture exchange device. In some embodiments, the wireless communication connection may be established when the second exchange device is within a communicable range (e.g., 1 foot) of the gesture exchange device. For example, the connection may be formed via a wireless PAN and the communicable range may include a communicable range of the wireless PAN. In general, where a gesture exchange distance is used, the gesture exchange distance may be defined to be less than the communicable range of the wireless PAN.

In some embodiments, to reduce signal interference and/or undesired data exchanges, the wireless communication connection may be established only after determining that the second exchange device within the gesture exchange distance and/or that the live gesture exchange signature matches the gesture exchange signature.

In some embodiments, the wireless communication connection may utilize low power communication protocol, such as a Bluetooth communication protocol (e.g., Bluetooth 4.0 LE). Additional examples regarding establishing one or more communication connections between gesture exchange devices, applicable to some embodiments, are discussed below with respect to methods 1000 and 1100 shown in FIGS. 10 and 11, respectively.

At 720, the gesture exchange device (e.g., circuitry of the gesture exchange device, processor 602, and/or gesture exchange module 614) may be configured to wirelessly send a user identifier associated with the user to the second gesture exchange device via the wireless communication connection. A "user identifier," as used herein, may refer to a code, token, key, alphanumeric, and/or other data that is exchanged between gesture exchange devices to facilitate the formation of user contacts. As such, the user identifier may uniquely identify the user, user account, and/or gesture exchange device.

In some embodiments, the user identifier may be stored in a memory of the gesture exchange device, such as memory 306 of gesture exchange device 300. Here, the gesture exchange device may be configured to access the user identifier from the memory and send the user identifier to the second gesture exchange device.

In some embodiments, the user identifier may be generated by a central system (e.g., system 102) and provided to gesture exchange devices (e.g., via system interface/user device 106) such that each gesture exchange device (and/or associated user and/or user account) can be uniquely identified via the user identifier. For example, the user identifier may be based at least in part on a random or pseudorandom code generated by the central system such that the user identifier is meaningless data to unauthorized third party systems and/or devices. In some embodiments, the user identifier may include a device identifier that is unique to the gesture exchange device. In some embodiments, the user identifier may alternatively or additionally include user identifying information of the user such as user name, account name, contact information, organization, title, and/or among other things.

In some embodiments, the user identifier of the gesture exchange device may be programmed and/or reprogrammed. For example, via system interface/user device 106 and/or network 104, central system 102 may be configured to push an updated user identifier to gesture exchange device 108. Additionally or alternatively, the gesture exchange device may be configured to request an updated user identifier, such as in response to a user request and/or otherwise in response to determining that the updated user identifier is needed (e.g., new user synchronization with a gesture exchange device previously associated with a different user, etc.).

At 722, the gesture exchange device may be configured to receive a second user identifier associated with a second user from the second gesture exchange device. As discussed in greater detail below, the second user identifier may be sent via the same wireless communication connection as the user identifier and/or may be sent via a different wireless communication connection. The discussion herein regarding the user identifier of the gesture exchange device may be applicable to the second user identifier. For example, the second user identifier may be stored in a memory of the second gesture exchange device and may be configured to uniquely identify the second gesture exchange device, second user, and/or second user account. As such, the second gesture exchange device may be configured to perform method 700 concurrently with the gesture exchange device to facilitate the two-way transfer of user identifiers. Method 700 may then proceed to 724 and end.

FIG. 8 shows a flowchart of an example method 800 for gesture-based data exchange, in accordance with some embodiments. Method 800 may be performed to exchange user data (e.g., user identifiers) between two or more gesture exchange devices. In some embodiments, method 800 may be performed alternatively to or additionally with method 700.

Method 800 may begin at 802 and proceed to 804, where a gesture exchange device may be configured to establish a wireless communication connection with a second gesture exchange device. Here, the wireless communication connection may be established prior to determination of the second gesture exchange device distance such that the wireless communication connection can be used to determine the second gesture exchange device distance (e.g., in alternative or addition to proximity sensor 310).

At 806, the gesture exchange device may be configured to determine a gesture exchange signature. Some or all of the discussion at 704 of method 700 may be applicable at 806.

At 808, the gesture exchange device may be configured to determine a second gesture exchange device distance. In some embodiments, the wireless communication connection established at 804 may alternatively or additionally be used to determine the distance that the second gesture exchange device is away from the gesture exchange device. For example, the distance may be determined based at least in part on received signal strength of one or more wireless communication connections formed via the wireless PAN between the gesture exchange device and the second gesture exchange device. Here, the gesture exchange distance may be defined at least in part by a signal strength threshold value such that received signal strengths that are stronger than the signal strength threshold value may indicate that the second gesture exchange device is within the gesture exchange distance of the gesture exchange device.

At 812, the gesture exchange device may be configured to determine whether the second gesture exchange device is within the gesture exchange distance of the gesture exchange device. Some or all discussion at 710 of method 700 may be applicable at 812.

In response to determining that the second gesture exchange device is not within the gesture exchange distance of the gesture exchange device, method 800 may return to 804, where the gesture exchange device may be configured to establish wireless communication connections with one or more other gesture exchange devices. Additionally or alternatively, the gesture exchange device may be configured to monitor changes in the second gesture exchange device distance for comparison with the gesture exchange distance (e.g., at 810).

In response to determining that the second gesture exchange device is within the gesture exchange distance of the gesture exchange device, method 800 may proceed to 814, where the gesture exchange device may be configured to receive one or more motion data values from the motion sensor (e.g., motion sensor 308). At 816, the gesture exchange device may be configured to determine a live gesture exchange signature based on the one or more motion data values. At 818, the gesture exchange device may be configured to determine whether the live gesture exchange signature matches the gesture exchange signature. In response to determining that the live gesture exchange signature fails to match the gesture exchange signature, method 800 may return to 814, where the gesture exchange device may be configured to continue receiving one or more motion data values from the motion sensor. In response to determining that the live gesture exchange signature matches the gesture exchange signature, method 800 may proceed to 820, where gesture exchange device may be configured to wirelessly send a user identifier associated with the user to the second gesture exchange device via the wireless communication connection. At 822, the gesture exchange device may be configured to receive a second user identifier associated with a second user from the second gesture exchange device. The discussions at 712-716, 720, and 722 of method 700 may be applicable at 814-822 and is not repeated to avoid unnecessarily overcomplicating the disclosure.

As discussed above, the steps shown in the method flowcharts discussed herein are not necessarily performed in the order shown in various embodiments. For example, in some embodiments, the gesture exchange device may be configured to establish one or more communication connections with the second gesture exchange device subsequent to determining that the live gesture signature matches the (e.g., stored) gesture exchange signature but prior to determining the second gesture exchange device distance. Method 800 may then proceed to 824 and end.

FIG. 9 shows a flowchart of an example method 900 for determining a gesture exchange signature, in accordance with some embodiments. Method 900 may be performed at 704 of method 700 and/or 806 of method 800. Alternatively or additionally, method 900 may be performed for calibration to generate a stored gesture signature that can be compared with live gesture signatures for triggering data exchange between gesture exchange devices (or a gesture exchange device and a second device).

Method 900 may begin at 902 and proceed to 904, where a gesture exchange device (e.g., circuitry of the gesture exchange device, processor 602, and/or gesture detection module 610) may be configured to receive one or more sequences of motion data values over time from the motion sensor. For example, the motion sensor may include an accelerometer, such as a three axis accelerometer configured to generate motion data values that include an X axis acceleration magnitude value, a Y axis acceleration magnitude value, and a Z axis magnitude value. In some embodiments, the motion data values over time may include sets of three axis acceleration magnitude values captured over time. For example, each set of three axis acceleration values may include an X axis acceleration magnitude value, a Y axis acceleration magnitude value, and a Z axis magnitude value generated in a measurement cycle of the accelerometer.

In some embodiments, one or more sequences of motion data values over time may include orientation data indicating orientation of gesture exchange device. For example, motion sensor 308 may include an accelerometer, a gyroscope, and/or an accelerometer with integrated orientation detection.

At 906, the gesture exchange device may be configured to determine a gesture exchange signature based at least in part on the one or more sequences of motion data values over time. In some embodiments, the gesture exchange signature may be defined by one or more motion data characteristics programmatically extracted from the one or more sequences of motion data values over time. The motion data characteristics may include, for example, motion data values associated time values for when the motion data values were captured, rhythmic frequency of motion (e.g., the frequency of up and down arm motions of a handshake), the magnitude(s) of motion (e.g., how much the user's hands move up and down during the handshake), the direction(s) of motion, the rotation(s) of motion, the duration and/or magnitude of directional and/or rotational motion, among other things. In that sense, virtually any type of unique user gesture can be detected and/or uniquely identified.

At 908, the gesture exchange device may be configured to store the gesture exchange signature in a memory. For example, the gesture exchange signature may be stored in memory 306 of gesture exchange device 300.

At 910, the gesture exchange device may be configured to access to stored gesture exchange signature from the memory for comparison with a live gesture exchange signature. As discussed above at 710 of method 700, the live gesture signature may be determined based on motion data values using the same and/or similar technique used to determine the gesture exchange signature at 906. For example, one or more live motion data characteristics may be programmatically extracted from one or more sequences of live motion data values over time. The gesture exchange device may be further configured to compare live motion data characteristics with the motion data characteristics of the stored gesture exchange signature. Method 900 may then proceed to 912 and end.

FIG. 10 shows a flowchart of an example method 1000 for establishing a wireless communication connection between gesture exchange devices, in accordance with some embodiments. For example, method 1000 may be performed by a gesture exchange device to establish a wireless communication connection with a second gesture exchange device. The wireless communication connection may utilize a low power consumption protocol that allows for the transmission and receipt of data within a single communication connection. Here, the two gesture exchange devices may be configured to operate in peer roles that allow two-way data exchange (e.g., within the same communication connection and/or session) subsequent to successful compatible device discovery.

Method 1000 may begin at 1002 and proceed to 1004, where a gesture exchange device may be configured to broadcast a gesture exchange service. The gesture exchange service may allow for the data exchanges discussed herein between two (or more) compatible gesture exchange devices that are within communicable range (e.g., of a wireless PAN generated by the gesture exchange device and/or second gesture exchange device). In some embodiments, broadcasting the gesture exchange service may include broadcasting of one or more Bluetooth characteristics that identifies the gesture exchange service. Additionally or alternatively, broadcasting the gesture exchange service may include broadcasting a code, key, and/or token, etc. that identifies the gesture exchange service for gesture exchange devices.

At 1006, the gesture exchange device may be configured to initiate listening for the gesture exchange service. In some embodiments, listening for the gesture exchange devices may include determining whether the one or more Bluetooth characteristics and/or code, key, and/or token, etc. broadcast by a second gesture exchange devices has been detected by the gesture exchange device. In some embodiments, the gesture exchange device may be configured to concurrently intimate the broadcasting and listening for the gesture exchange service.

At 1008, the gesture exchange device may be configured to determine whether a connection request has been received from the gesture exchange device. For example, the second gesture exchange device may be configured to initiate listening for the gesture exchange service, and in response to detecting the gesture exchange service broadcast by the gesture exchange device at 1004, may be configured to send the connection request to the gesture exchange device.

In response to determining that a connection request has been received from the second gesture exchange device, method 1000 may proceed to 1010, where the gesture exchange device may be configured to establish wireless communication connection with the second gesture exchange device and the gesture exchange device having a peer role. A peer role, as used herein, may refer to a profile and/or other configuration of a gesture exchange device where the gesture exchange device is capable of transmitting and receiving data from the second gesture exchange device via the same communication connection.

Returning to 1008, in response to determining that a connection request has not been received, method 1000 may proceed to 1018, where the gesture exchange device may be configured to determine whether a gesture exchange service broadcast by the second gesture exchange device has been detected. For example, the second gesture exchange device may be configured to (e.g., concurrently) broadcast the gesture exchange service which may be detected by the gesture exchange device when the gesture exchange device is within communicable range.

In response to determining that the gesture exchange service broadcast by the second gesture exchange device has failed to be detected, method 1000 may return to 1008, where the gesture exchange device may be configured to continue to determine whether a connection request from the second exchange device has been received.

In response to determining that the gesture exchange service broadcast by the second gesture exchange device has been detected, method 1000 may proceed to 1020, where the gesture exchange device may be configured to send a connection request to the second gesture exchange device.

Method 1000 may then proceed to 1010, where the gesture exchange device may be configured to establish the wireless communication connection with the second gesture exchange device as a peer device as discussed above.

At 1012, the gesture exchange device may be configured to wirelessly send a user identifier associated with the user to the second gesture exchange device via the communication connection. At 1014, the gesture exchange device may be configured to wirelessly receive a second user identifier associated with a second user from the second gesture exchange device via the (e.g., same) communication connection (or session). Method 1000 may then proceed to 1016 and end.

FIG. 11 shows a flowchart of an example method 1100 for establishing a wireless communication connection between gesture exchange devices, in accordance with some embodiments. In some embodiments, a gesture exchange device may be configured to utilize a low power consumption communication protocol that allows the gesture exchange device to perform a master role (e.g., to receive data) or slave role (to transmit data), but not both concurrently within the same communication connection. One example of such a communication protocol includes Bluetooth 4.0 LE, although other suitable protocols may be used. Here, a gesture exchange device may be configured to perform the master role (e.g. to receive data) via a first wireless communication connection with the second gesture exchange device and concurrently and/or sequentially perform the slave role (e.g., to send data) via a second wireless communication connection.

Method 1100 may begin at 1102 and proceed to 1104, where the gesture exchange device may be configured to determine whether to initiate broadcasting or listening of a gesture exchange service. In some embodiments, the determination may be based on the user identifier associated with the gesture exchange device. For example, the user identifier may include connection role data indicating whether the gesture exchange device is configured to initiate broadcasting or listening when establishing the communication connection.

In response to determining to initiate broadcasting, method 1100 may proceed to 1106, where the gesture exchange device may be configured to initiate the broadcasting of the gesture exchange service. The discussion at 1004 of method 1000 may be applicable at 1006.

At 1108, the gesture exchange device may be configured to determine whether a connection request from a second exchange device has been received. The discussion at 1008 of method 1000 may be applicable at 1108.

In response to determining that a connection request has from the second exchange device has been received, method 1100 may proceed to 1110, where the gesture exchange device may be configured to establish a wireless communication connection with the second gesture exchange device having a master role and the gesture exchange device having a slave role. In the slave role, the gesture exchange device may be configured to send data to the second gesture exchange device in the master role via the communication connection.

At 1112, the gesture exchange device may be configured to wirelessly send a user identifier to the second gesture exchange device via the wireless communication connection. The discussion at 820 of method 800 may be applicable at 1112.

At 1114, the gesture exchange device may be configured to establish a second wireless communication connection with the second gesture exchange device having a slave role and the gesture exchange device having the master role. In various embodiments, the second wireless communication connection may be established after the user identifier is sent to the second gesture exchange device or concurrently with the establishment of the first wireless communication connection. In that sense, the gesture exchange device may be configured to perform both master and slave roles for transmitting and receiving data, concurrently or otherwise.

At 1116, the gesture exchange device may be configured to wirelessly receive a second user identifier from the second gesture exchange device via the second wireless communication connection. The discussion at 822 of method 800 may be applicable at 1116. In some embodiments, as discussed in connection with method 1000, a single communication connection may be used for sending and transmitting. For example, the gesture exchange device may be configured to use a communication protocol that supports concurrent master and slave roles within the same communication connection. Method 1100 may then proceed to 1018 and end.

Returning to 1106, in response to determining that a connection request has failed to be received from a second gesture exchange device, method 1100 may return to 1104, where the gesture exchange device may be configured to determine whether to initiate the broadcasting or listening of the gesture exchange service. In some embodiments, the gesture exchange device may be configured to attempt broadcasting and listening (e.g., alternatively and/or for predetermined periods of time) until a suitable compatible second gesture exchange device is discovered.

In response to determining to initiate the listening for the gesture exchange service, method 1100 may proceed to 1120, where the gesture exchange device may be configured to initiate listening for the gesture exchange service. The discussion at 1006 of method 1000 may be applicable at 1120.

At 1022, the gesture exchange device may be configured to determine whether a gesture exchange service broadcast by a second gesture exchange device has been detected. The discussion at 1018 of method 1000 may be applicable at 1120.

In response to determining that a gesture exchange service broadcast by a second gesture exchange device has failed to be detected, method 1100 may return to 1104, where the gesture exchange device may be configured to determine whether to initiate the broadcasting or listening of the gesture exchange service.

In response to determining that a gesture exchange service broadcast by a second gesture exchange device has been detected, method 1100 may proceed to 1124, where the gesture exchange device may be configured to send a connection request to the second gesture exchange device. The discussion at 1020 of method 1000 may be applicable at 1124.

At 1126, the gesture exchange device may be configured to establish a wireless communication connection with the second gesture exchange device having a slave role and the gesture exchange device having the master role. The discussion at 1110 may be applicable at 1126. Here, however, the master and slave roles are reversed for the gesture exchange device and the second gesture exchange device.

At 1128, the gesture exchange device may be configured to wirelessly receive a second user identifier from the second gesture exchange device via the wireless communication connection. The discussion at 1116 may be applicable at 1128.

At 1130, the gesture exchange device may be configured to establish a second wireless communication connection with the second gesture exchange device having a master role and the gesture exchange device having the slave role. The discussion at 1114 may be applicable at 1130. Here, however, the master and slave roles are reversed for the gesture exchange device and the second gesture exchange device.

At 1132, the gesture exchange device may be configured to wirelessly send the user identifier to the second gesture exchange device via the second wireless communication connection. The discussion at 1112 may be applicable at 1132. Method 1100 may then proceed to 1118 and end.

FIG. 12 shows a flowchart of an example method 1200 for programmatically associating users, in accordance with some embodiments. Method 1200 may be performed to associate users via user accounts, which may be managed and/or provided by central system 102.

Method 1200 may begin at 1202 and proceed to 1204, where a gesture exchange device may be configured to wirelessly receive a second user identifier associated with a second user from a second gesture exchange device. For example, some or all of methods 700-1100 may be used to receive the second user identifier from the second gesture exchange device.

At 1206, the gesture exchange device may be configured to provide the second user identifier to a server interface/user device. For example, subsequent to receiving and storing user identifiers (and/or other data) from other gesture exchange devices, gesture exchange device 108 may be configured to synchronize with system interface/user device 106 via a wired and/or wireless connection to provide the stored user identifiers to the server interface/user device. The gesture exchange device may be further configured to erase received user identifiers from memory subsequent to the synchronization such that the gesture exchange device can be used to collect additional user identifiers.

As discussed above, the server interface/user device may include a user device associated with the user such as a mobile phone, tablet, laptop, desktop, workstation, among other things. The gesture exchange device may be configured to synchronize with the user device via a wired connection (e.g., USB, pin connectors, Ethernet, audio jack, etc.), such as directly and/or through synchronization device 408 shown in FIG. 4. Additionally or alternatively, the gesture exchange device may be configured to synchronize with the user device via a wireless connection (e.g., Bluetooth, Wifi, etc.). For example, in some embodiments, a Bluetooth 4.0 LE communication protocol may be used with the gesture exchange device in a slave role and the user device in a master role.

In some embodiments, the server interface/user device may include a communication beacon and/or other receiver. For example, one or more communication beacons may be disposed within a monitored area such as at a tradeshow, meeting, conference, among other things. The communications beacons may be strategically placed at and/or near the monitored area such as to form a mesh of wireless signal coverage within one or more areas of interest. The gesture exchange device may be configured to establish wireless communication connections with the communication beacons and send received user identifiers to the communication beacons. Here, synchronization with the central system may be performed in real-time via the communication beacons. Similarly, processing based on received user identifiers may be performed without a user device (e.g., being carried on the user and/or used for a subsequent synchronization). In some embodiments, a gesture exchange device may be configured to provide the second user identifier directly to the central system (e.g., via network 104).

At 1208, a central system may be configured to receive the second user identifier from the server interface/user device. For example, the server interface/user device may be configured to provide the second user identifier via network 104.

At 1210, the central system may be configured to associate a user identifier with a user account. The user account may include data that is associated with the user. In some embodiments, each user carrying a gesture exchange device may be associated with a unique user account that is managed by the central system. Some example data that may be associated with the user account may include the user and/or device identifier, user name, contact information (e.g., email address, phone number, address, etc.), profile information (e.g., profile image, company, title, interests, etc.), login information (e.g., account name, password), networking information (e.g., associated user accounts, friends, business contacts, leads, groups, newsfeeds, likes, etc.), and/or associated third party accounts (e.g., social networking accounts, customer relationship management accounts, etc.).

In some embodiments, the central system may be configured to allow a new user to register the user account. For example, the central system may receive some or all of the data discussed above from a user device and may generate the user account based on the received data. In some embodiments, the central system may be configured to allow a user to sign-in with a third party account. For example, third party system 114 may be provide third party user data to the central system, which may allow the user to access and/or register the user account via a third party account (e.g., by providing third party login data). For third party networking and/or social networking accounts, the central system may be further configured to receive networking data (e g, friends, business contacts, etc.) from the third party system and associate user accounts based on the networking data.

At 1212, the central system may be configured to determine a second user account associated with the second user identifier. As discussed above, each user identifier may be associated with a unique user account. The second user account and associated data may be stored in database 112 and accessed by server 110 via a query based on the second user identifier.

At 1214, the central system may be configured to associate the user account with the second user account. The user account and second user account may be connected user accounts via the association. Additionally or alternatively, the central system may be configured to associate and/or connect one or more third party user accounts of the user and second user. In that sense, the central system may provide a communication hub that provides access to some or all of a user's accounts via a single universal online identity.

In some embodiments, the central system may be configured to provide a user interface for managing user contacts. The user interface may be provided to a user device 106, such as in response to the user providing login data via an application and/or webpage provided by the central system. For example, subsequent to synchronization, the central system may be configured to provide a user interface that includes user data associated with each user identifier collected by the user's gesture exchange device. The user may be allowed to request and/or accept associations (e.g., sent by the second user) between the user account and the second user account, a third party user account and the second user account, and/or the user account and the second user account. In that sense, the central system may be configured to associate one or more user accounts of the two users. The interface may also allow the user to perform contact management functionality including deleting connected users, data privacy/share settings, etc.

At 1216, the central system may be configured to provide user information associated with the second user account to a user device associated with the user account. The user information may include some or all of the data discussed above associated with user accounts including profile information, contact information, event alerts, lead information, etc. The central system may provide for one or more of the saving, developing, compiling, updating, maintaining, and/or prioritizing of contact lists and important relationships.

The central system may be further configured to receive updated user information and to provide the updated user information to suitable connected users. Method 1200 may then proceed to 1218 and end.

CONCLUSION

Many modifications and other embodiments will come to mind to one skilled in the art to which these embodiments pertain having the benefit of the teachings presented in the foregoing descriptions and the associated drawings. For example, the discussion herein regarding exchange of user data or user identifiers may be extended to other types of data that can be wirelessly exchanged based on the gesture recognition techniques and/or PANs discussed herein. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

We claim:

1. A wearable device, comprising:
    a motion sensor configured to generate motion data values:
    a gesture detection module configured to detect performance of a gesture exchange signature based on the motion data values;
    a proximity detection module configured to determine whether a second device is within a gesture exchange distance of the wearable device by comparing a detected distance of the second device away from the wearable device to the gesture exchange distance;
    a gesture exchange module configured to wirelessly send a user identifier associated with the user to the second device in response to (i) the gesture detection module detecting performance of the gesture exchange signature and (ii) the proximity detection module determining that the second device is within the gesture exchange distance of the wearable device;
    a communications module configured to establish a wireless connection with the second device for data exchange, wherein the communications module is configured to establish the wireless connection with the second device in response to the proximity detection module determining that the second device is within the gesture exchange distance of the wearable device.

2. The wearable device of claim 1, wherein the motion sensor is configured to generate orientation data indicative of orientation of the wearable device.

3. The wearable device of claim 1, wherein the user identifier includes contact information.

4. The wearable device of claim 3, wherein the contact information includes a code generated by a central system.

5. The wearable device of claim 1, wherein the second device is determined whether within the gesture exchange distance of the wearable device based at least in part on received signal strength of a wireless communication connection.

6. The wearable device of claim 1, wherein the proximity detection module includes a proximity sensor.

7. The wearable device of claim 1, wherein the distance of the second device away from the wearable device is detected using a proximity sensor.

8. A machine-implemented method for data exchange of a wearable device, comprising:
    receiving one or more motion data values from a motion sensor that is worn by a user;
    detecting, by circuitry, a performance of a gesture exchange signature based on the one or more motion data values received from the motion sensor;
    determining a second device is within a gesture exchange distance of the wearable device by comparing a detected distance of the second device away from the wearable device to the gesture exchange distance;
    in response to (i) detecting the performance of the gesture exchange signature and (ii) the second device is determined to be within the gesture exchange distance of the wearable device, wirelessly sending a user identifier associated with the user to the second device;
    and
    establishing a wireless connection with the second device for data exchange.

9. A system for data exchange among a plurality of wearable devices, comprising:
    a central system configured to generate one or more user identifiers to be exchanged among the plurality of wearable devices;
    the plurality of wearable devices associated with a plurality of users, wherein at least one of the plurality of wearable devices comprises:
        a motion sensor configured to generate motion data values:
        a gesture detection module configured to detect performance of a gesture exchange signature based on the motion data values; and
        a proximity detection module configured to determine whether a second wearable device is within a gesture exchange distance of the at least one wearable device by comparing a detected distance of the second device away from the at least one wearable device to the gesture exchange distance;
        a gesture exchange module configured to wirelessly send a user identifier associated with the user of the at least one wearable device to the second wearable device from the plurality of wearable devices in response to (i) the gesture detection module detecting performance of the gesture exchange signature and (ii) the proximity detection module determining that the second wearable device is within the gesture exchange distance of the at least one wearable device;
        and
        a communications module configured to establish a wireless connection with the second wearable device for data exchange, wherein the communications module is configured to establish the wireless connection with the second wearable device in response to the proximity detection module determining that the second wearable device is within the gesture exchange distance of the at least one wearable device.

* * * * *